(12) United States Patent
Theodore

(10) Patent No.: US 8,496,268 B2
(45) Date of Patent: Jul. 30, 2013

(54) UNIVERSAL CHASSIS

(75) Inventor: Chris P. Theodore, Birmingham, MI (US)

(73) Assignee: Theodore & Associates LLC, Birmingham, MI (US)

( * ) Notice: Subject to any disclaimer, the term of this patent is extended or adjusted under 35 U.S.C. 154(b) by 0 days.

(21) Appl. No.: 13/397,329

(22) Filed: Feb. 15, 2012

(65) Prior Publication Data

US 2012/0175863 A1    Jul. 12, 2012

Related U.S. Application Data

(63) Continuation-in-part of application No. 12/019,490, filed on Jan. 24, 2008, now abandoned.

(51) Int. Cl.
*B62D 7/22* (2006.01)

(52) U.S. Cl.
USPC .............. 280/784; 280/798; 280/124.109

(58) Field of Classification Search
USPC ................... 280/784, 798, 124.109
See application file for complete search history.

(56) References Cited

U.S. PATENT DOCUMENTS

| | | | |
|---|---|---|---|
| 1,991,619 A | 2/1935 | Donald | |
| 2,079,218 A | 5/1937 | Kedwinka | |
| 2,084,809 A | 6/1937 | Jencick | |
| 2,328,144 A | 8/1943 | Haspel | |
| 3,743,314 A | 7/1973 | Archer | |
| 4,232,755 A * | 11/1980 | Dow | 180/65.6 |
| 4,924,961 A | 5/1990 | Bernardi | |
| 4,966,408 A | 10/1990 | Yura et al. | |
| 5,042,870 A | 8/1991 | Yura et al. | |
| 5,314,205 A | 5/1994 | Glesmann | |
| 5,409,264 A * | 4/1995 | Nakatani | 280/834 |
| 5,584,510 A * | 12/1996 | Thuliez | 280/784 |
| 6,015,022 A | 1/2000 | Thuliez | |
| 6,390,224 B1 * | 5/2002 | Yoshida | 180/312 |
| 6,460,889 B2 * | 10/2002 | Iyanagi et al. | 280/784 |
| 7,096,986 B2 | 8/2006 | Borroni-Bird et al. | |
| 7,201,247 B2 | 4/2007 | Hurlburt | |
| 7,370,886 B2 * | 5/2008 | Luttinen et al. | 280/781 |
| 7,380,830 B2 * | 6/2008 | Mitsui et al. | 280/784 |
| 7,836,999 B2 * | 11/2010 | Kato | 180/312 |
| 7,886,861 B2 * | 2/2011 | Nozaki et al. | 180/232 |
| 7,887,123 B2 * | 2/2011 | Honji et al. | 296/187.09 |
| 8,196,696 B2 * | 6/2012 | Karube et al. | 180/311 |
| 2004/0118627 A1 | 6/2004 | Ohtsuki et al. | |

OTHER PUBLICATIONS

"Innovation in spotlight", Mark Phelan, Detroit Free Press, Apr. 10, 2011.

(Continued)

*Primary Examiner* — Toan To
(74) *Attorney, Agent, or Firm* — Harness, Dickey & Pierce, P.L.C.

(57) ABSTRACT

A vehicle chassis that incorporates the engine structure, transaxle structure and a backbone structure provided as a unitary structure onto which other components of a vehicle, such as suspension, steering, body and crash absorbers may be attached. The backbone structure is a closed tubular structure in which a relatively rigid drive shaft can be supported for rotational power delivery between the engine and the transaxle. Several variations of the basic chassis embodiment are disclosed to accommodate rear wheel drive, front wheel drive, four wheel drive, as well as internal combustion, electrical and hybrid powered vehicles. Front and rear energy absorbing crash structures are rigidly fixed to front and rear sub-frames of the vehicle chassis.

28 Claims, 29 Drawing Sheets

OTHER PUBLICATIONS

"A Good Guy with a Great Idea", Wes Raynal, Autoweek, May 2, 2011.
Lotus 49, Photo of Stressed Engine Transaxle, Wikipedia.
Google Image, Lotus 49.
Lotus 49 Assembly Drawings.
Lotus 49 Stressed Engine Description, Wikipedia.

* cited by examiner

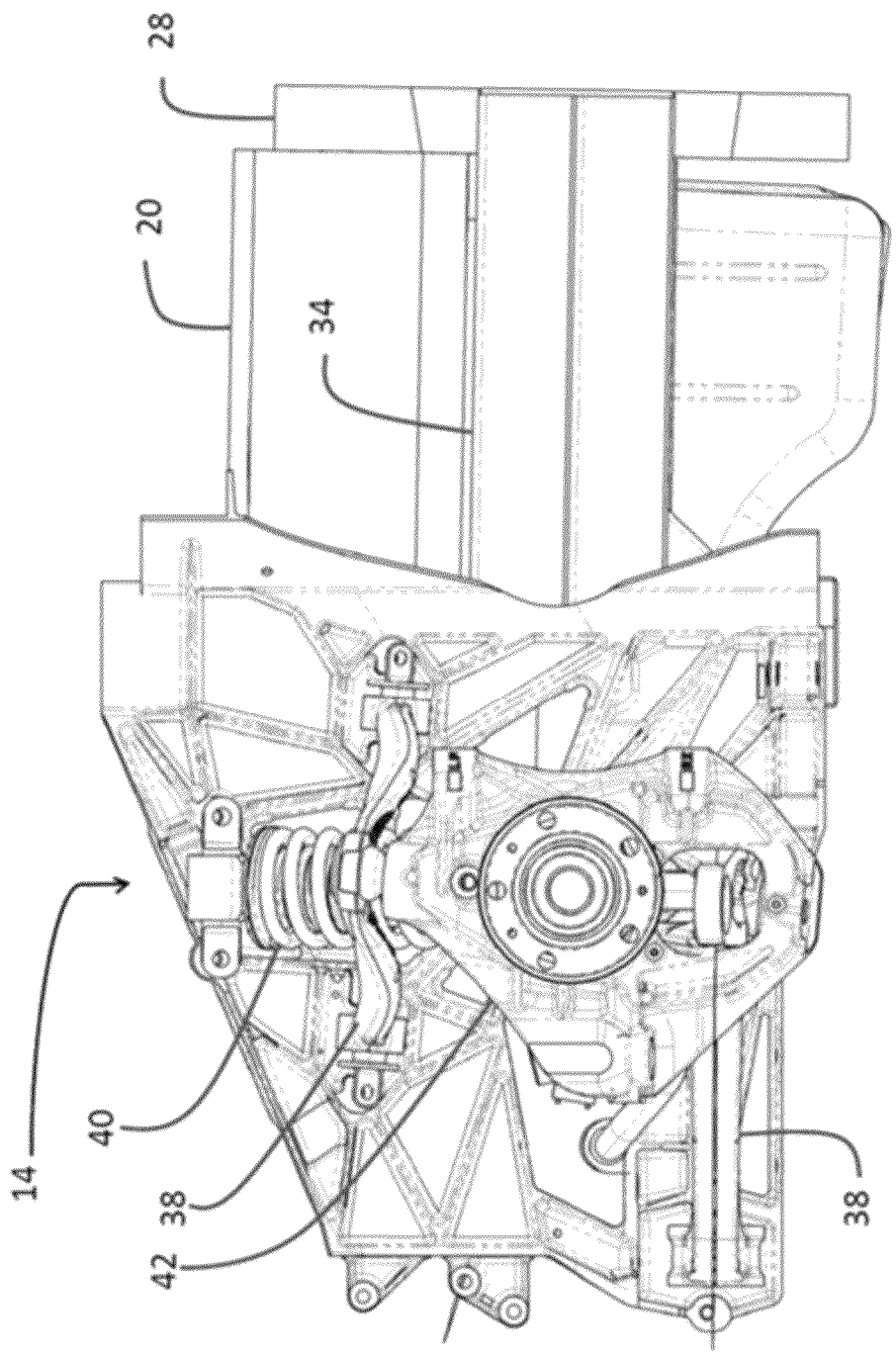

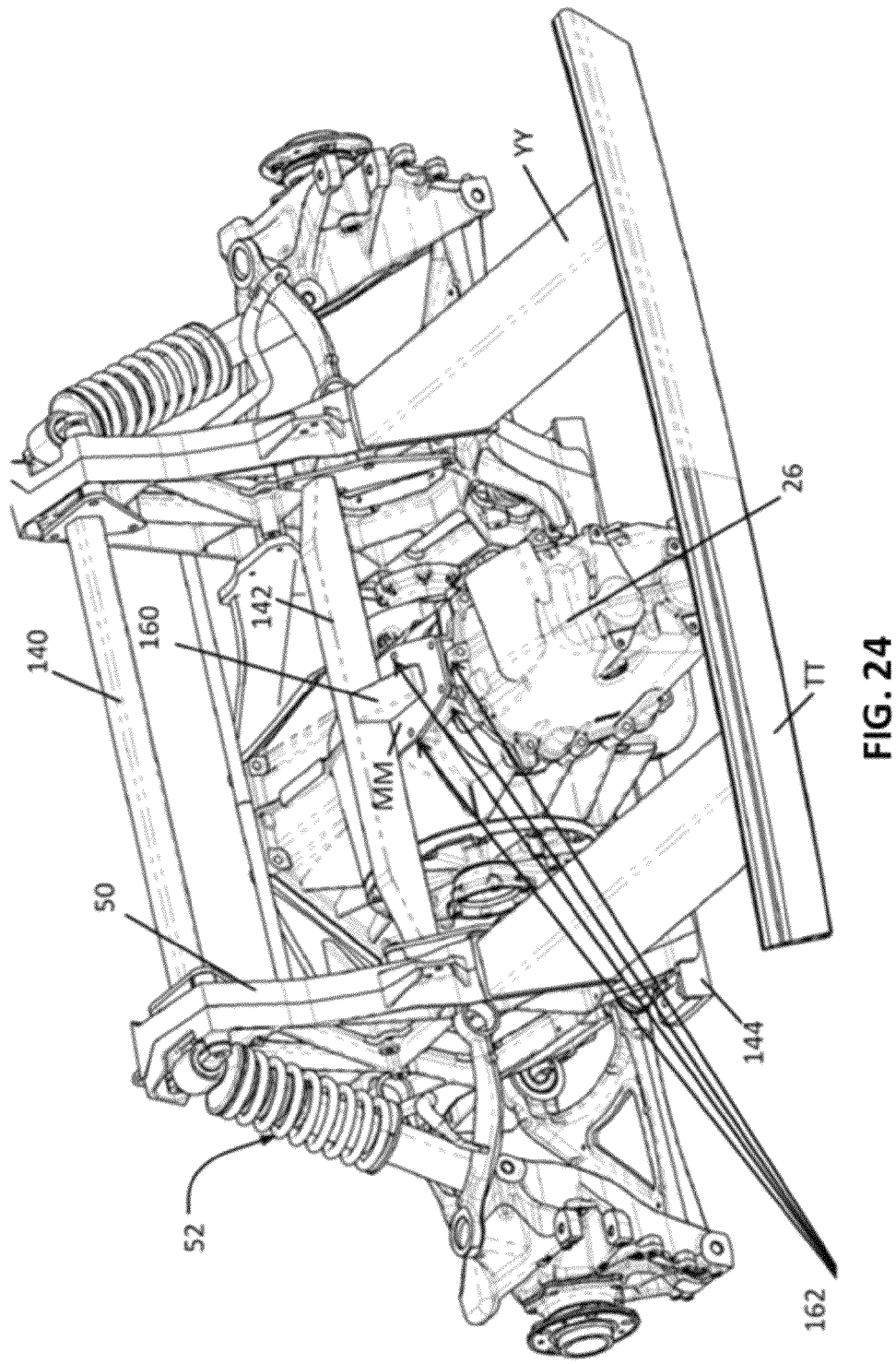

UNIVERSAL CHASSIS

CROSS-REFERENCE TO RELATED APPLICATIONS

This application is a continuation-in-part of U.S. patent application Ser. No. 12/019,490 filed on Jan. 24, 2008. The disclosure of the above application is incorporated herein by reference.

FIELD

This invention is related to the field of automotive chassis design and more specifically to the area of interchangeable chassis for use with many models of vehicles.

BACKGROUND

The statements in this section merely provide background information related to the present disclosure and may not constitute prior art.

Traditionally, vehicles are made up on framed chassis or on a rigid uni-body chassis. These two types of chassis have both advantages and disadvantages when compared to each other and are well known in the automotive industry. A main deficiency attributed to each of the traditional chassis types is that they are not readily adaptable to a wide variety of vehicles without forcing major and expensive redesign work for each vehicle. As a result, almost every model of vehicle has a unique chassis that is unusable for other vehicle designs. The present invention is based on an attempt to address the disadvantages known in the two commonly used chassis types and also to provide a simple chassis that can be used in a wide variety of vehicle designs.

SUMMARY

The unique features of this invention include the combination of a rigid backbone structure connecting front and rear structures (in the preferred embodiment, the front engine and rear transaxle), in combination with the front and rear suspensions rigidly affixed to the front and rear structures (or backbone mounting surfaces) such that suspension loads (in the preferred embodiment) stress the engine block and transaxle case, to create a complete, self-supporting chassis without the need for a separate frame, or the need to attach the front and rear suspension subassemblies to a rigid uni-body. In addition, the front and rear structures incorporate energy absorbing crash boxes affixed to the front and rear structures so that crash impact energy is transferred from the bumper beams, absorbed by the deformable energy boxes, and reacted by front and rear structures that transfer loads to the rigid backbone.

The problems solved by the present invention include an ability to attach different bodies, or body styles to the same uni-chassis; an ability to scale the uni-chassis to different size vehicles (e.g., wheelbase) by increasing or decreasing the length of the backbone structure. Weight savings are provided by using the backbone to serve the functions of (1) torsion and bending support for the chassis and (2) a torque tube to support drive torque from the engine to transaxle through a quill shaft mounted inside the backbone. Other problems solved by the present invention include an ability to de-couple chassis loads (e.g., ride and handling loads including drive, braking, steering) from (1) body loads and (2) absorb impact (crash) loads through the crash boxes to the backbone rather than the body; (3) an ability to create a "rolling chassis", before installation of the body structure; (4) an ability to reduce weight by stressing the normally unstressed engine and transaxle structures with chassis loads thereby reducing chassis structure and weight; and (5) an ability to optimize total vehicle weight, weight distribution and minimize polar moment of inertia (about the yaw axis) through minimization of weight and location of the major vehicle masses within the wheelbase of the vehicle.

Advantages of the present invention over prior constructions are simplicity (minimizing cost and manufacturing investment), weight reduction, reduction in polar moment of inertia about the yaw axis, and an ability to adapt to different bodies and body styles, and to create a rolling chassis. Other advantages include elimination of a traditional frame and its associated weight and cost, or the need to transfer suspension loads into a uni-body structure, which also effects weight and cost; and flexibility in creating unique chassis for different engines, transaxles and suspension components while maintaining the same uni-chassis architecture. Thus, a series of modules could be created for front, rear and backbone structures, allowing the creation of many different chassis using the three essential building blocks (front, backbone, and rear structures along with front and rear energy absorbing crash boxes). Still further advantages are an ability to scale the uni-chassis to different sizes and de-couple chassis loads from body loads. The backbone structure also provides a secure environment to pass electrical wiring, fuel lines and brakes lines through the bearing supports so that these components are protected from the environment and impact (crash) events.

The sales and market potential of this invention are particularly well suited to specialty vehicles since multiple vehicles can be made off the same uni-chassis as engineering and tooling investment can be spread among multiple models. This invention is also particularly well suited for Battery Electric Vehicles (BEVs) and Plug-in Hybrids (PHEVs), since the battery pack can be mounted inside the backbone—eliminating the need for a separate battery box—thus reducing cost and weight. Manufacturing investment is low. The uni-chassis is scaleable to different sizes. The uni-chassis is modular, in that different front, rear and backbone modules and energy absorbing crash boxes can be combined to create different chassis. The uni-chassis can be sold as a complete rolling chassis, or as three independent modules plus front and rear crash boxes, to the aftermarket, allowing others to create unique vehicles. For high volume production, this invention continues to offer advantages of lower cost, weight and manufacturing investment.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a cross-sectional view of the universal chassis taken along line 4-4 of FIG. 3a;

FIG. 7 is a side view of the universal chassis shown coupled to the rear structure depicting the rigid attachment of the transaxle shown in FIG. 2a;

FIG. 9b is a partial side view of the front structure and engine;

Figure 10:
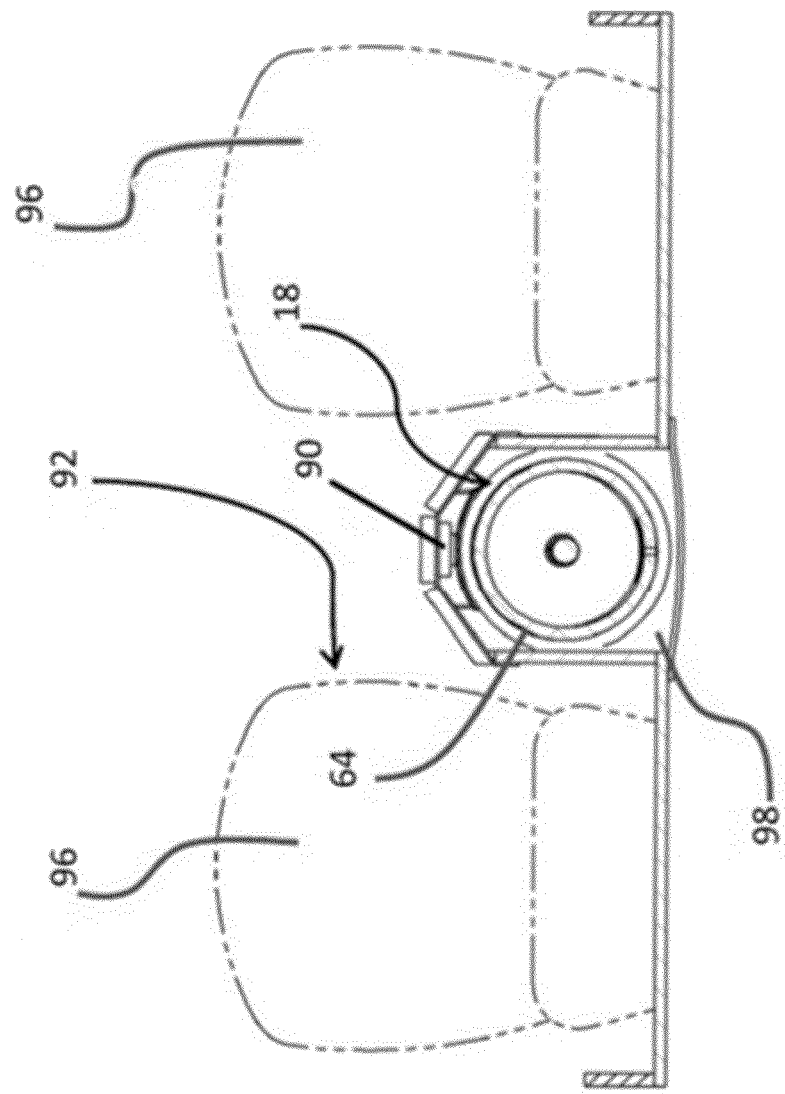

FIG. 10 is a cross-sectional view of an exemplary universal chassis represented as being associated with a vehicle body; the body is isolated from the Uni-Chassis by body mounts. As shown, the body floorpan encapsulates the backbone with a floorpan tunnel that is capped from the bottom by an undertray, so as to create a closed section. This is done so that side impact forces to the body during crash impacts are transferred to, and reacted by the Uni-Chassis backbone.

Figure 11:
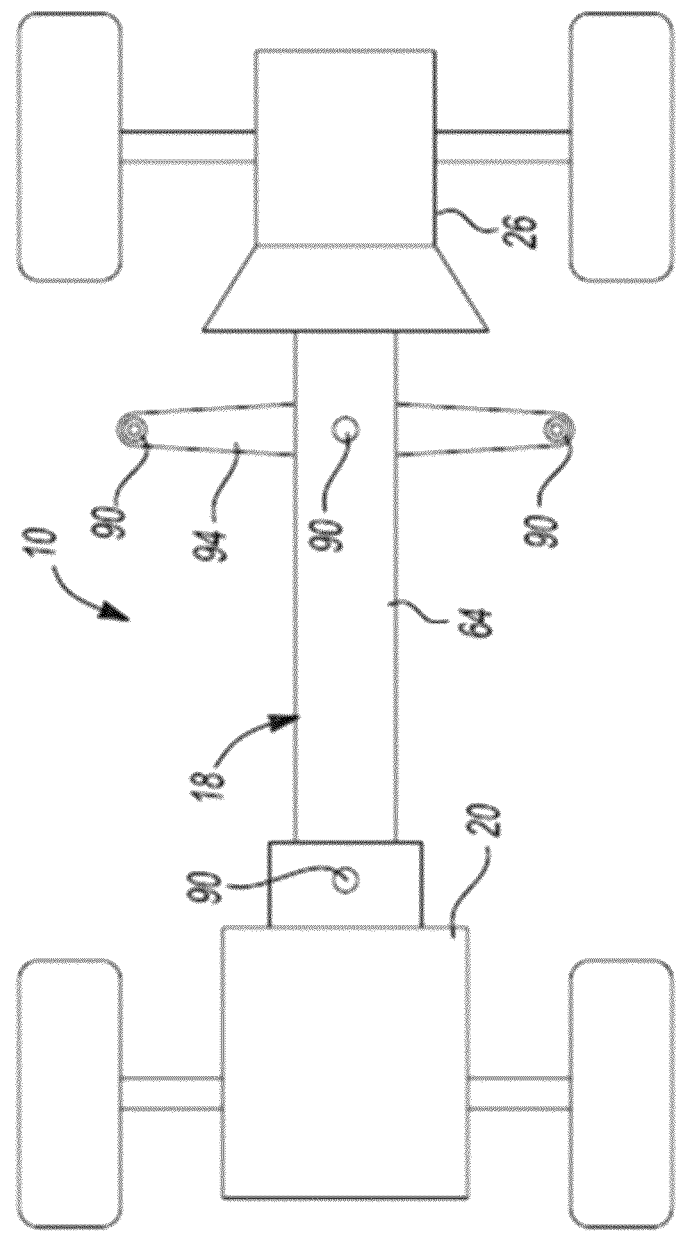
Figure 12:
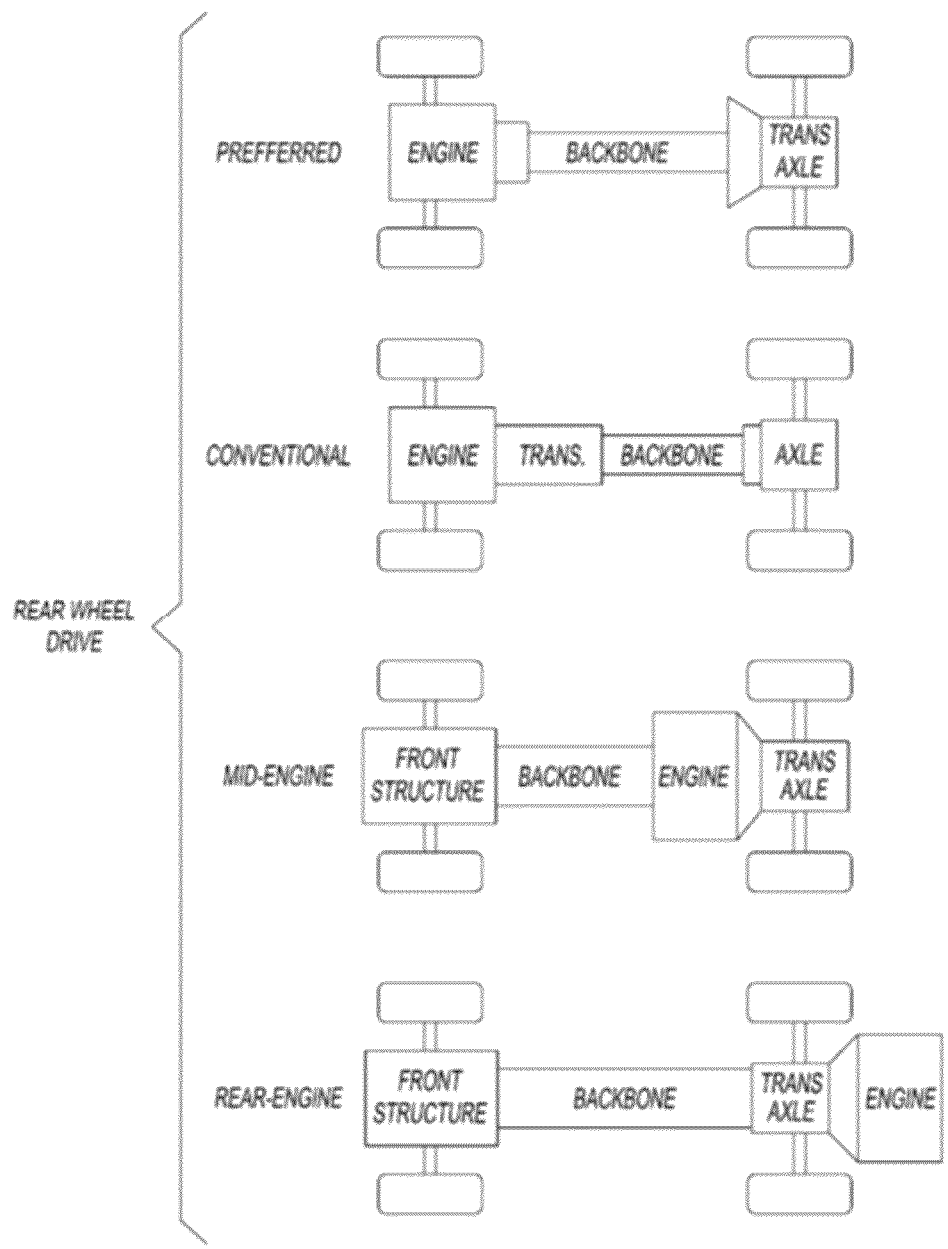
Figure 13:
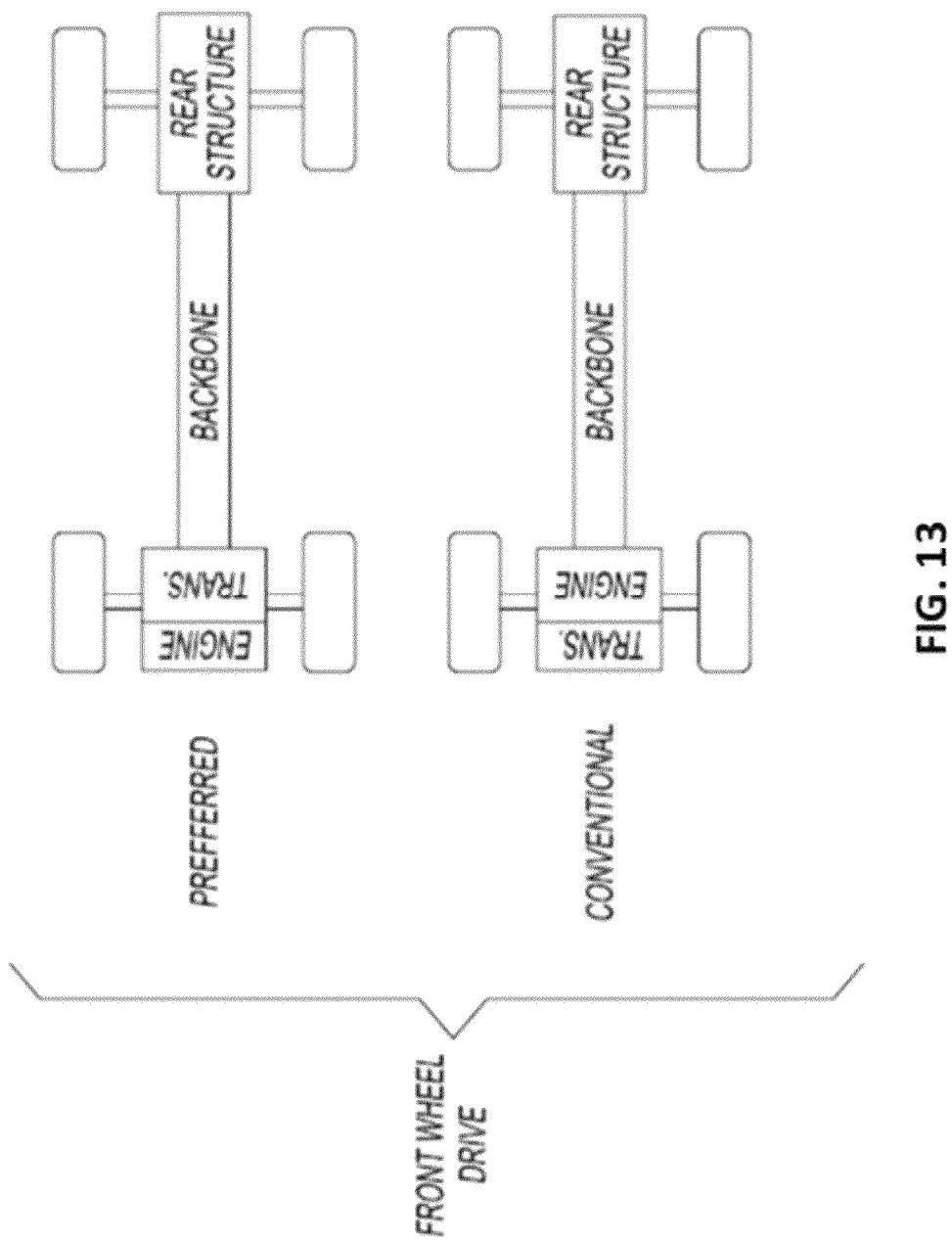
Figure 14:
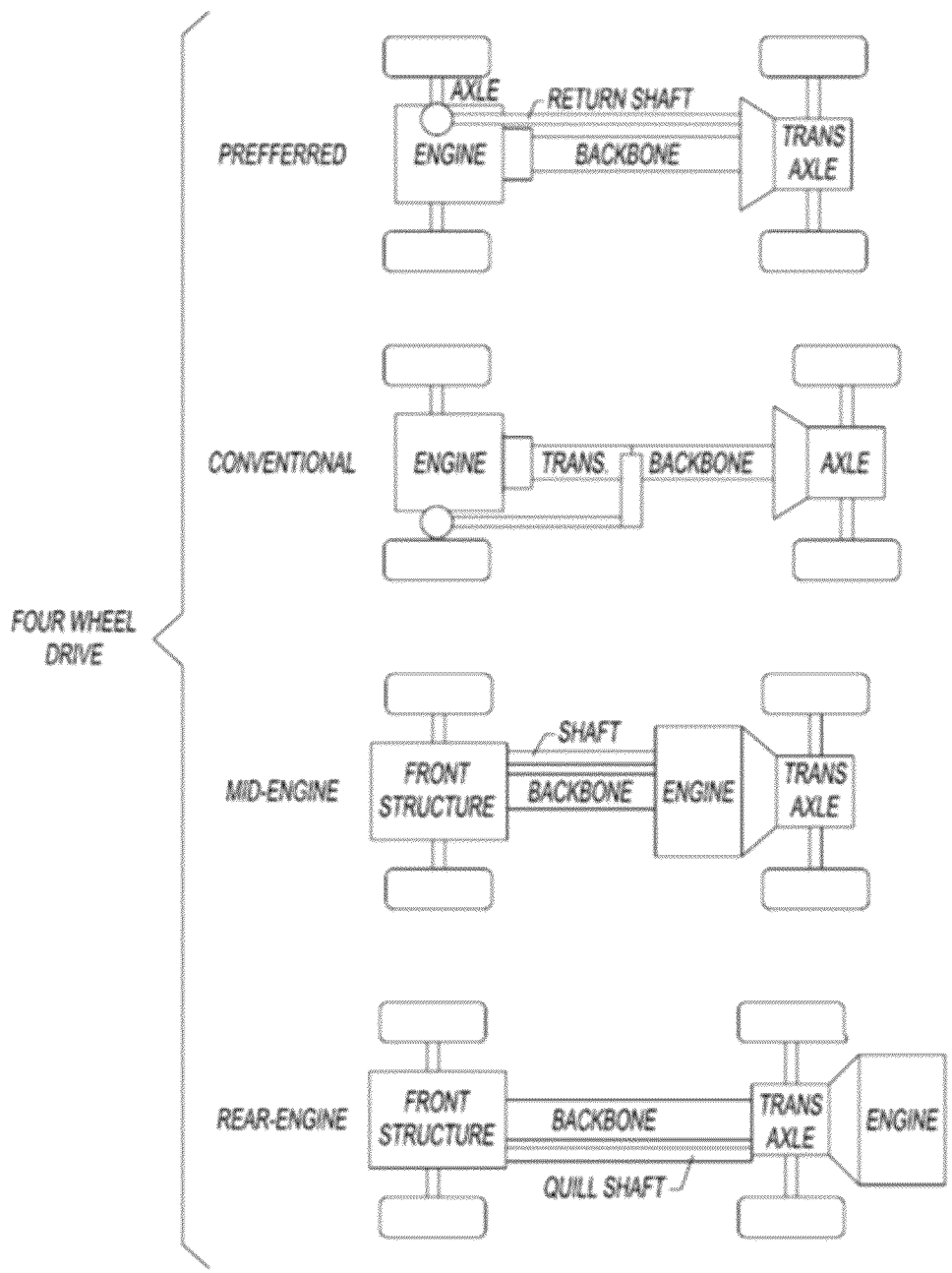
Figure 15:
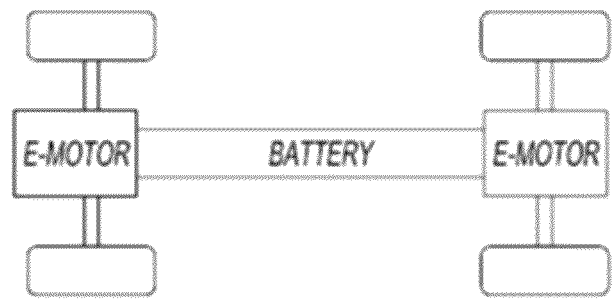
Figure 16:
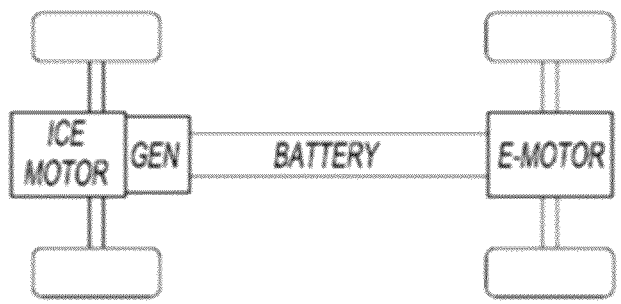
Figure 17:
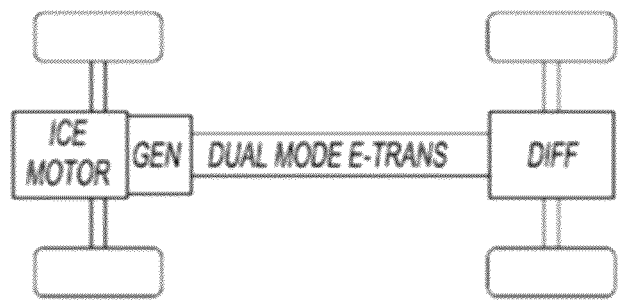
Figure 18:
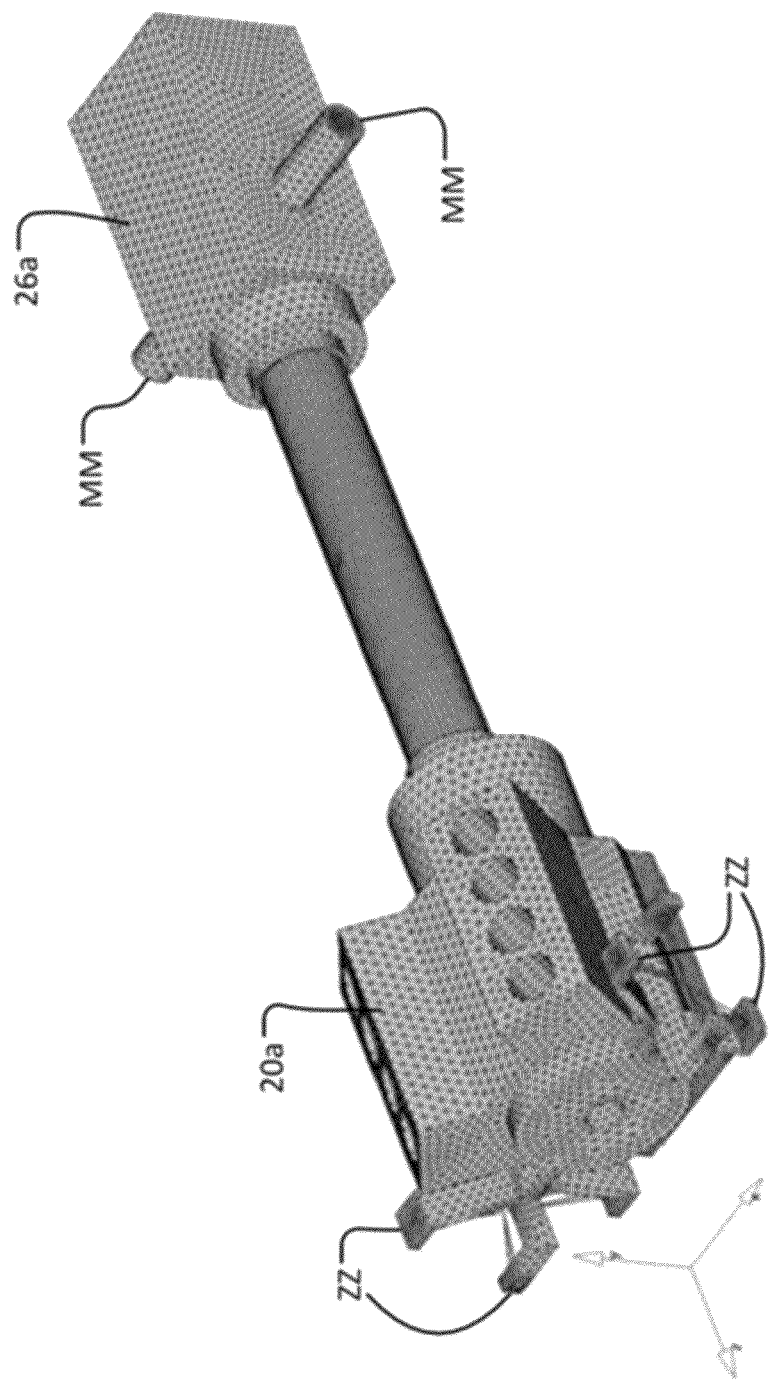
Figure 19:
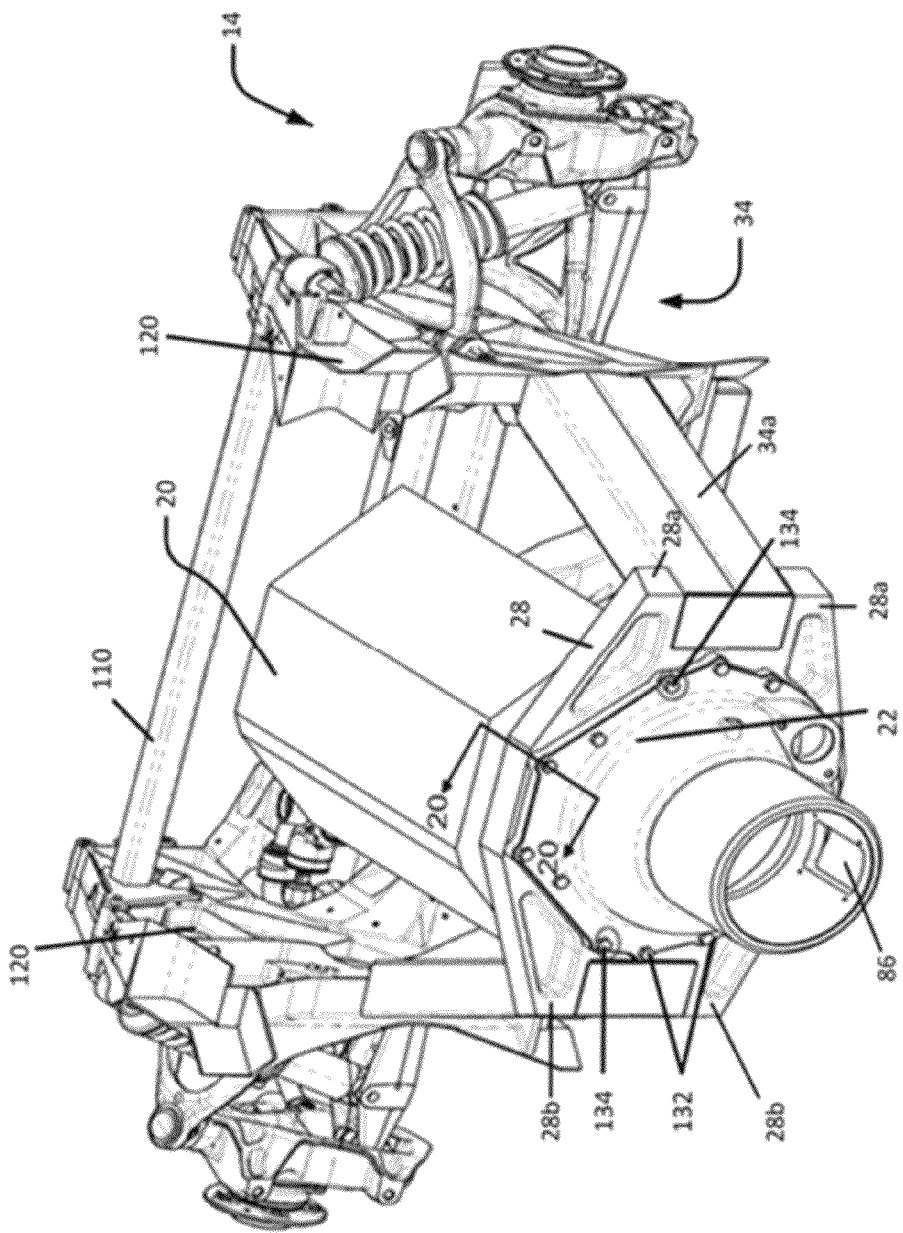
Figure 20:
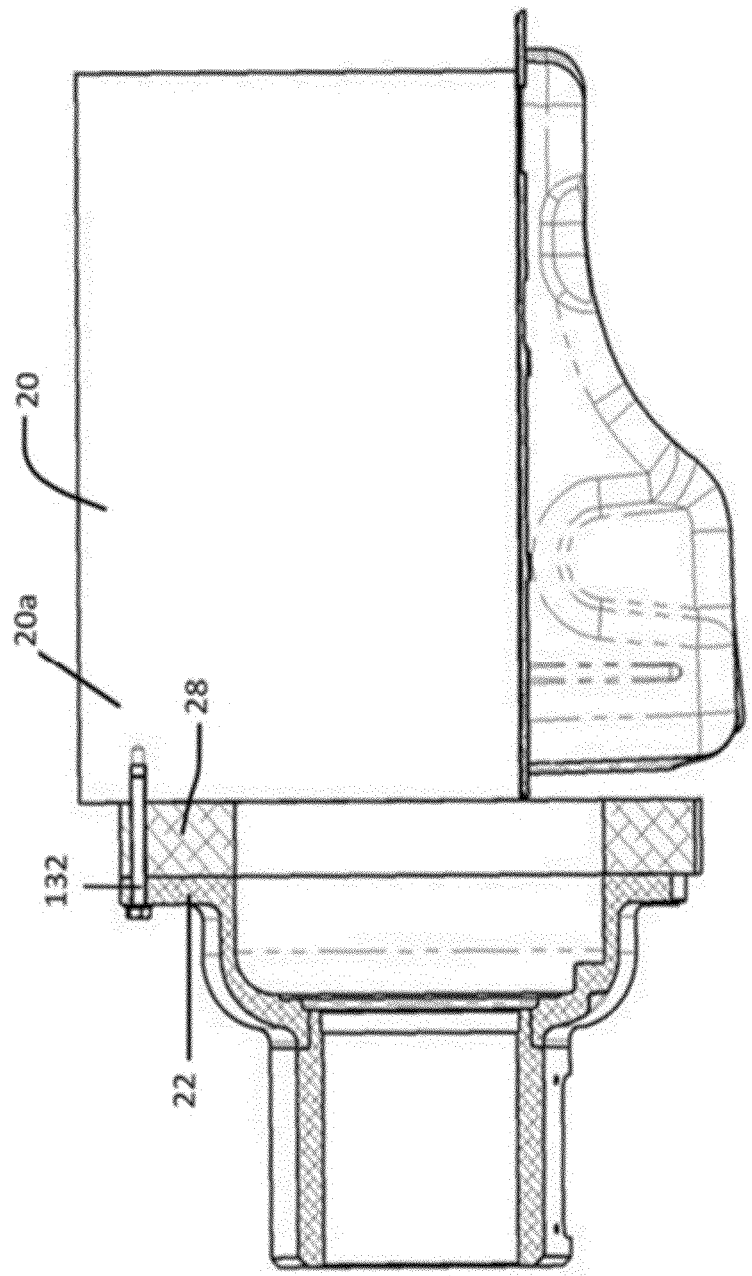
Figure 21:
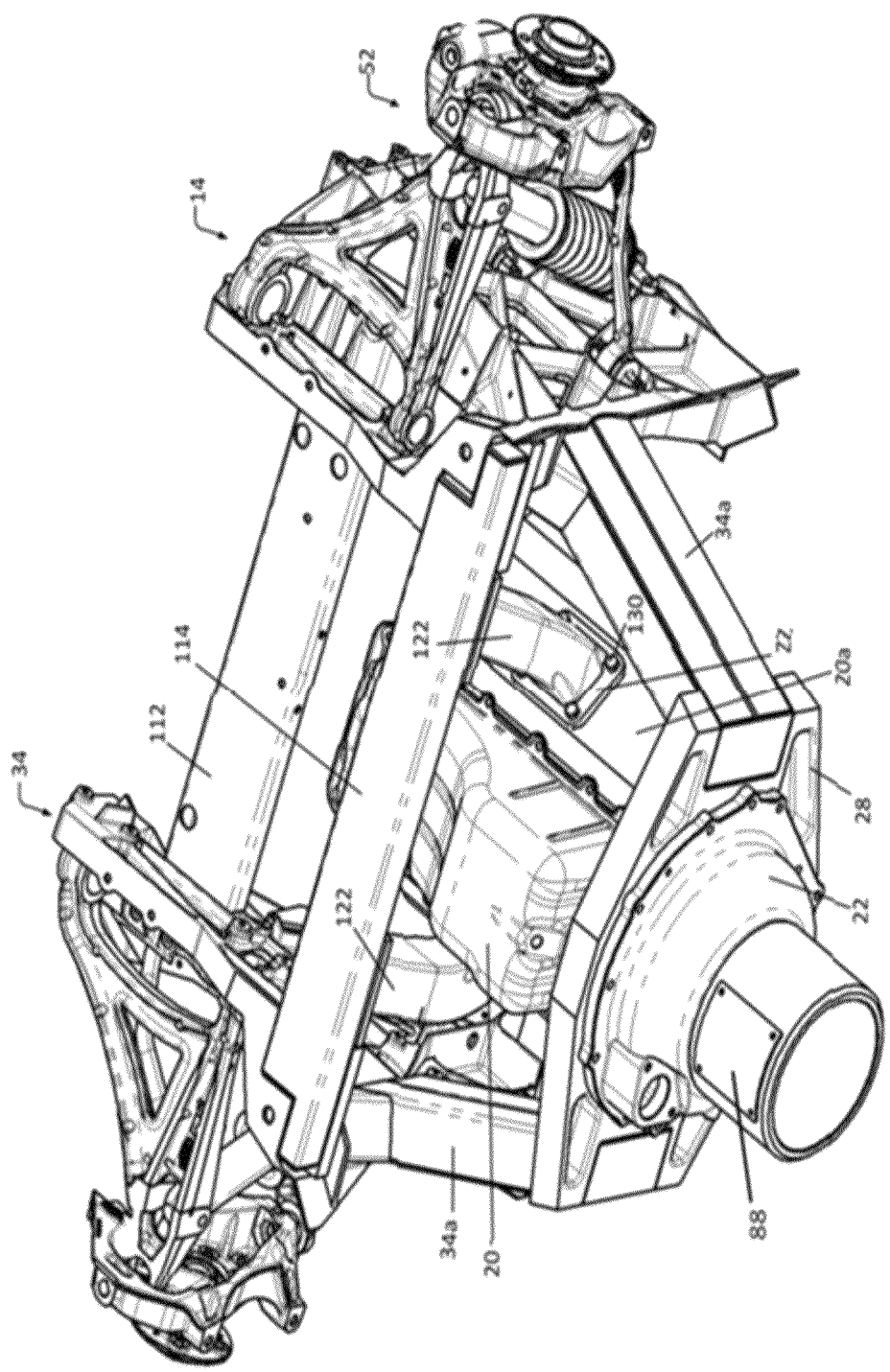
Figure 22:
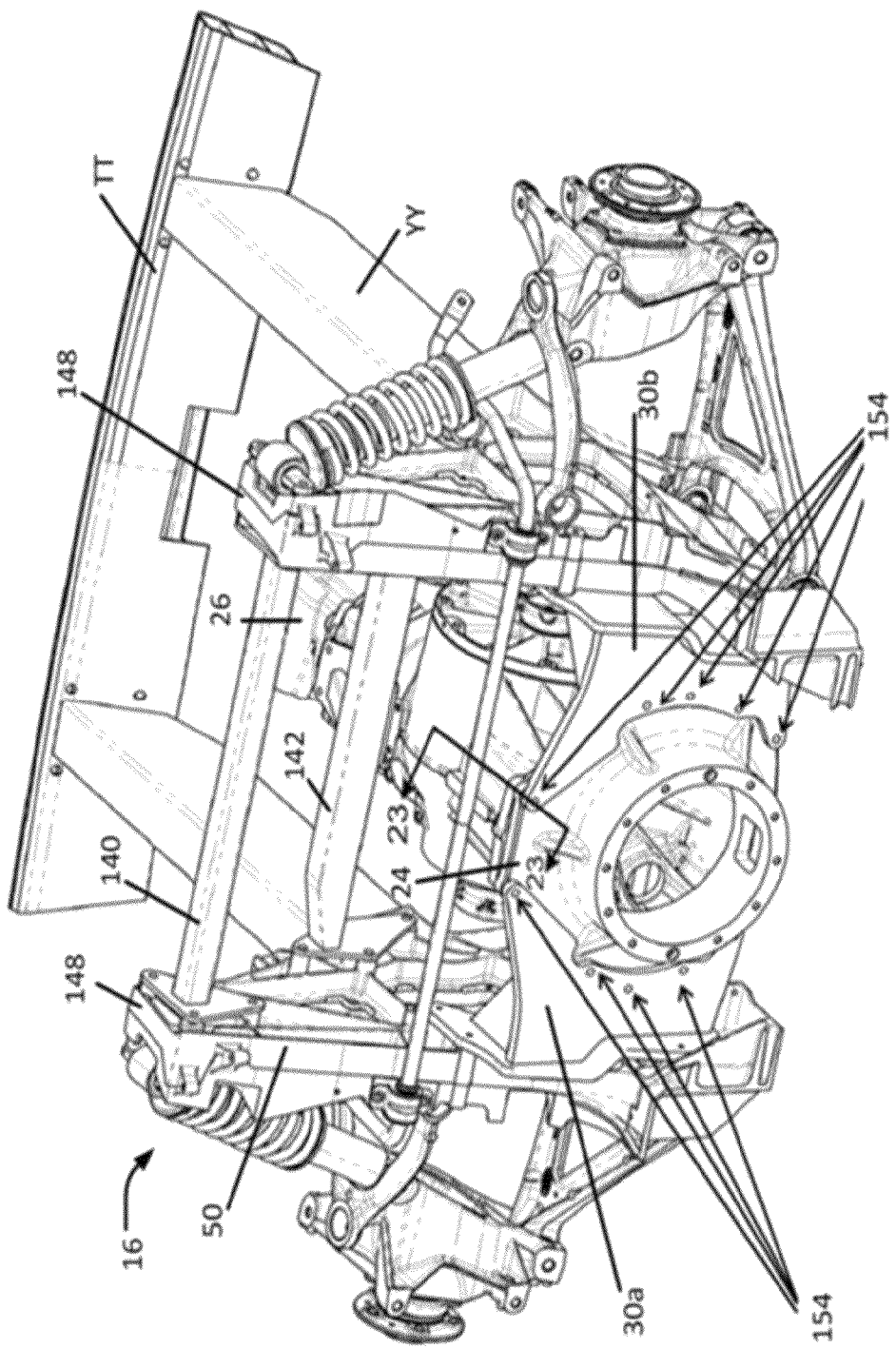
Figure 23:
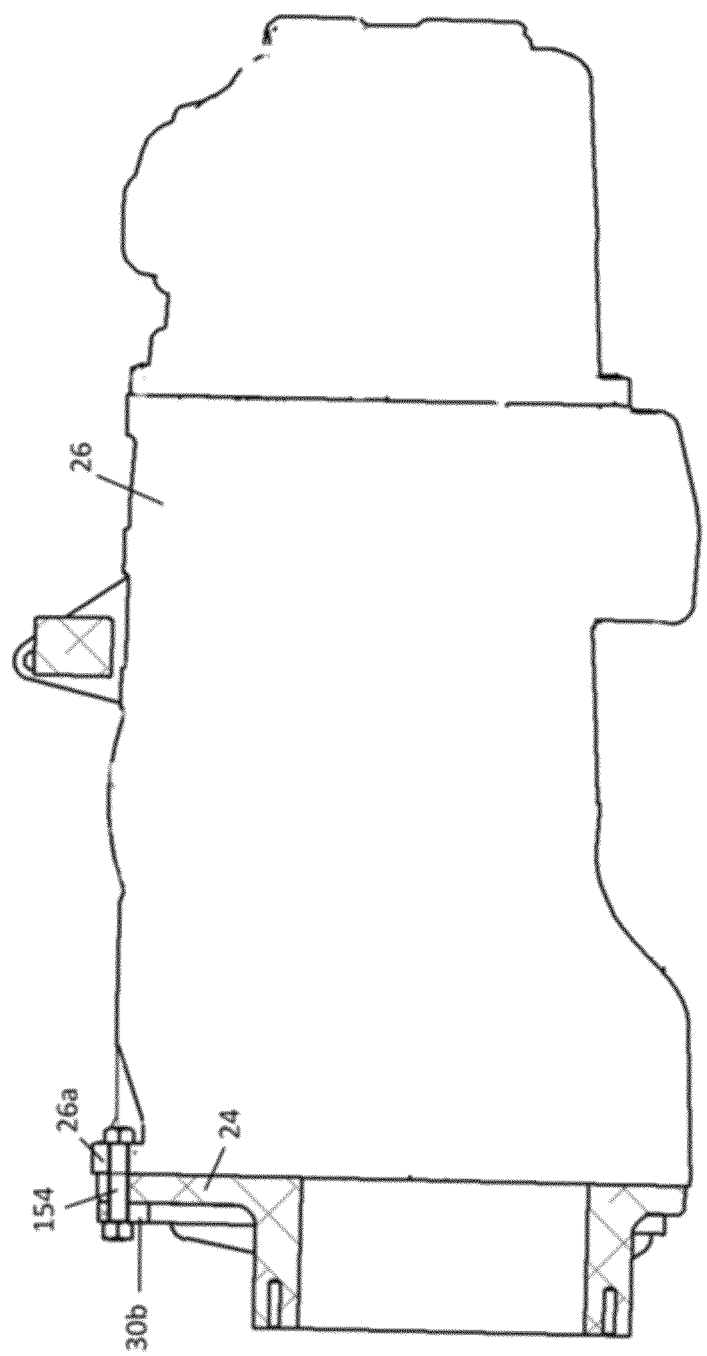

FIG. 11 is a top view of a universal chassis shown with body mounts according to additional features;

FIG. 12 represents the universal chassis according to the present teachings that accommodates various rear wheel drive configurations;

FIG. 13 represents the universal chassis according to the present teachings that accommodates various front wheel drive configurations;

FIG. 14 represents the universal chassis according to the present teachings that accommodates various four wheel drive configurations;

FIG. 15 represents the universal chassis according to the present teachings that accommodates an electrically powered four wheel drive configuration;

FIG. 16 represents the universal chassis according to the present teachings that accommodates a plug-in series hybrid type powertrain configuration;

FIG. 17 represents the universal chassis according to the present teachings that accommodates a dual-mode hybrid type configuration;

FIG. 18 represents a Finite Element model of the front engine, rear transaxle and backbone reacting torsional and bending suspension loads;

FIG. 19 is a front perspective view of the front structure of the universal chassis constructed in accordance to one example of the present disclosure;

FIG. 20 is a cross-sectional view taken along lines 20-20 of FIG. 19;

FIG. 21 is a bottom perspective view of the front structure of FIG. 19;

FIG. 22 is a front perspective view of the rear structure of the universal chassis constructed in accordance to one example of the present disclosure;

FIG. 23 is a cross-sectional view taken along lines 23-23 of FIG. 22; and

FIG. 24 is a rear perspective view of the rear structure of FIG. 23.

DETAILED DESCRIPTION

The following description is merely exemplary in nature and is not intended to limit the present disclosure, application, or uses.

While the present invention is summarized above as being applicable for several types of vehicles, it is exemplified herein as being installed in a conventional front engine vehicle with a rear transaxle.

Figure 1:
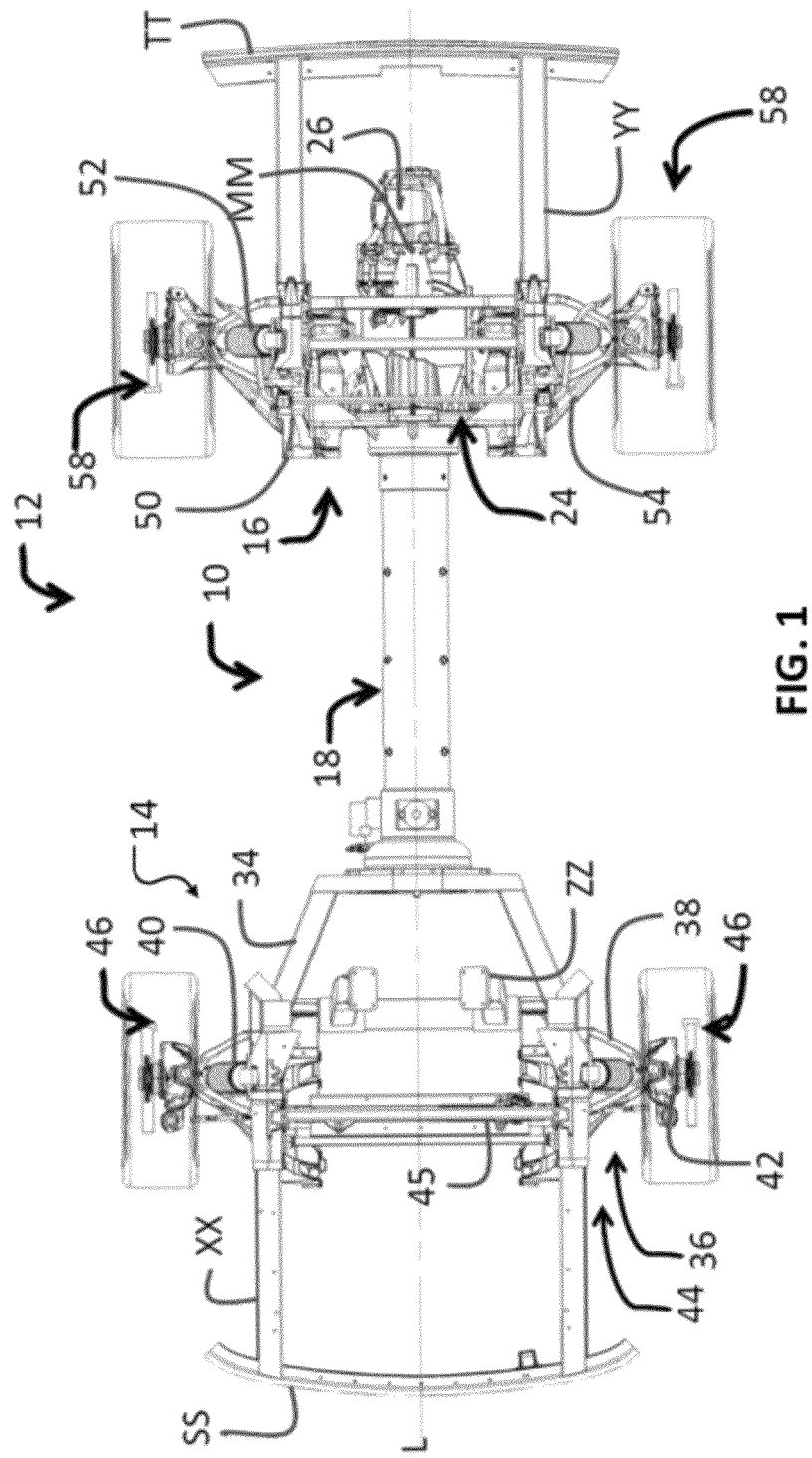
FIG. 1 is a schematic plan view of a universal chassis according to one example of the present teachings and shown on an exemplary vehicle.
Figure 2A:
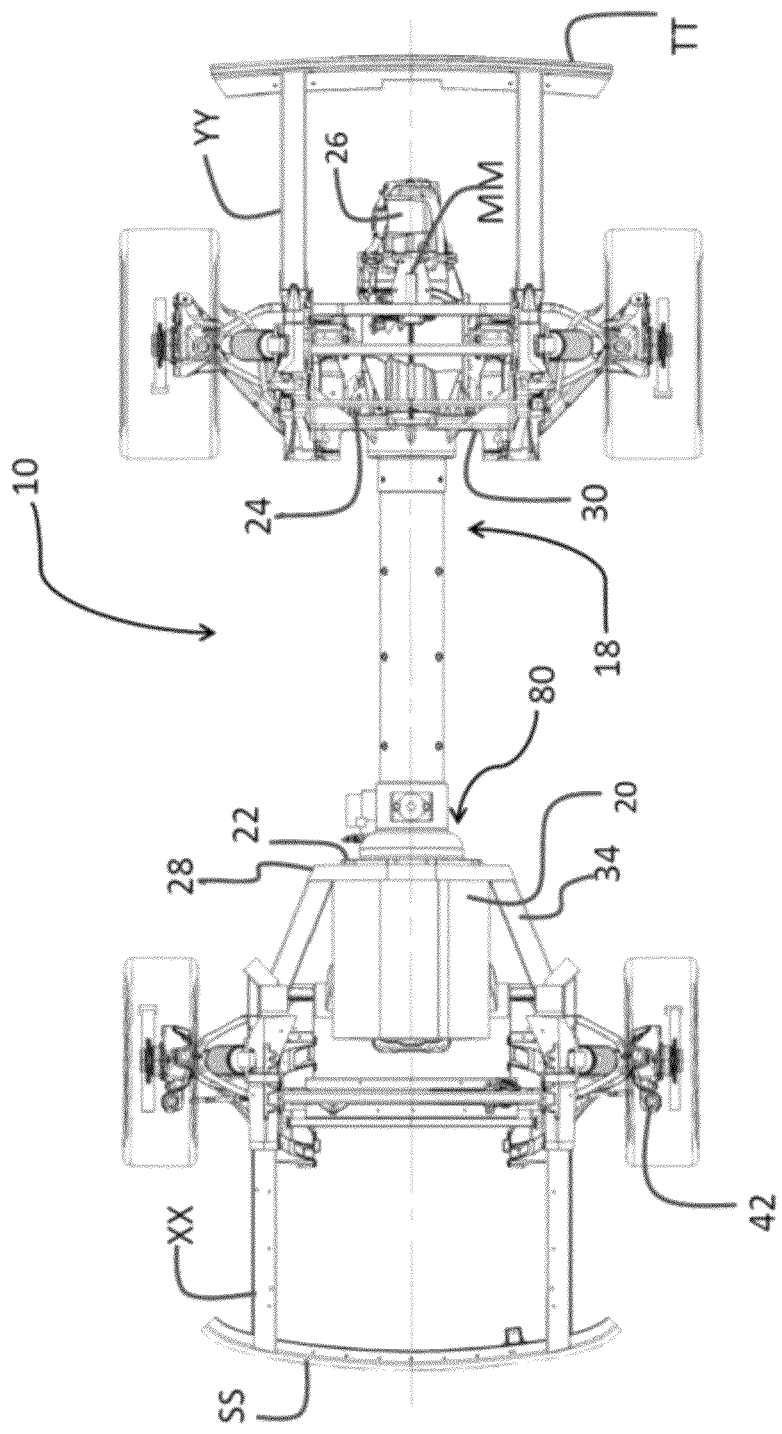
FIG. 2a is a detail top plan view of the universal chassis of FIG. 1.
Figure 2B:
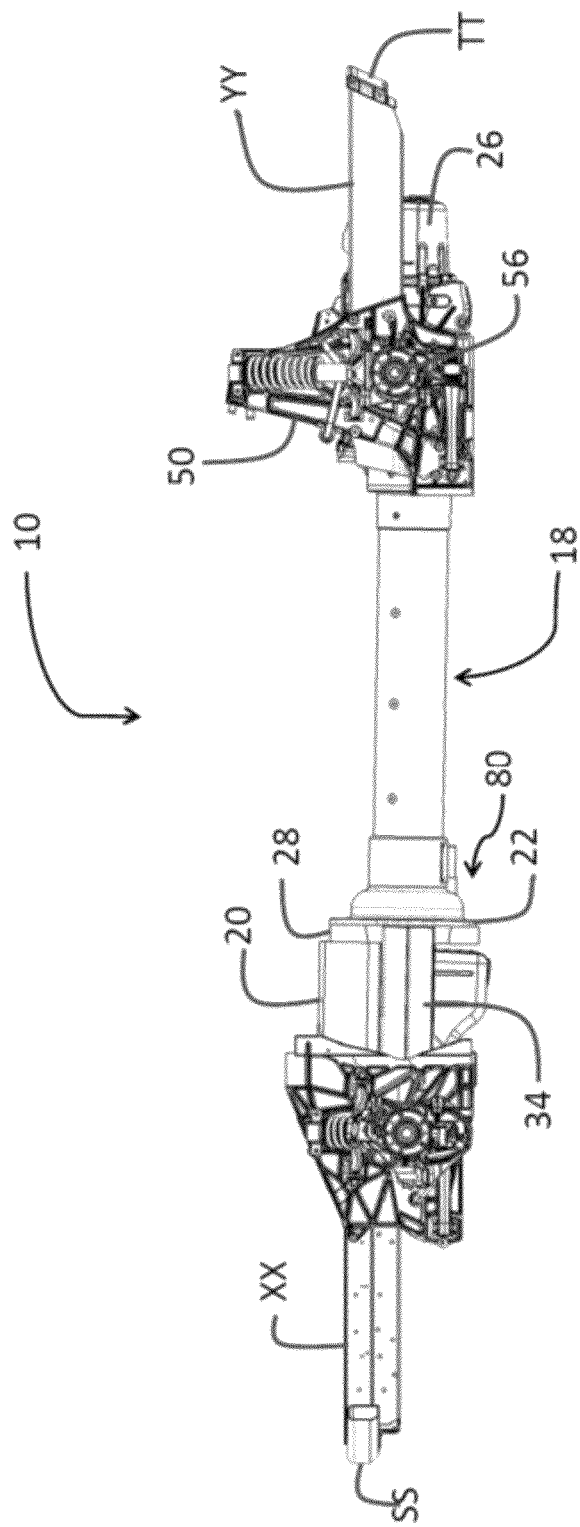
FIG. 2b is a detail side view of the universal chassis of FIG. 1.
Figure 2C:
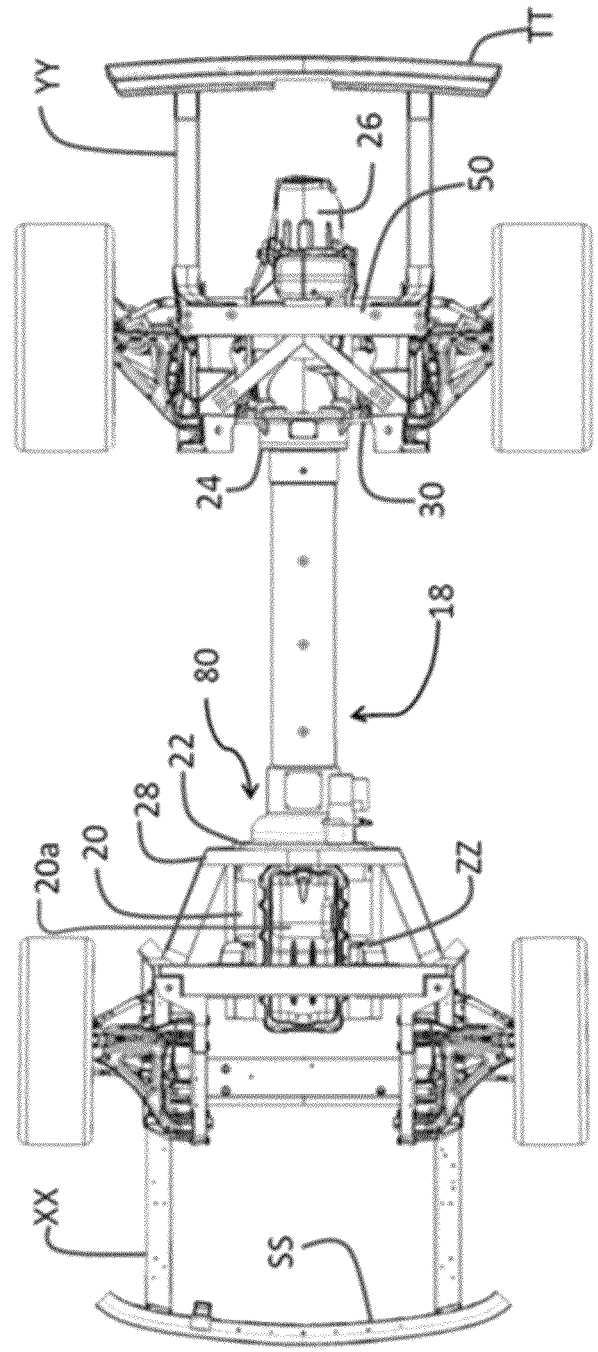
FIG. 2c is a detail bottom plan view of the universal chassis of FIG. 1.
Figure 3A:
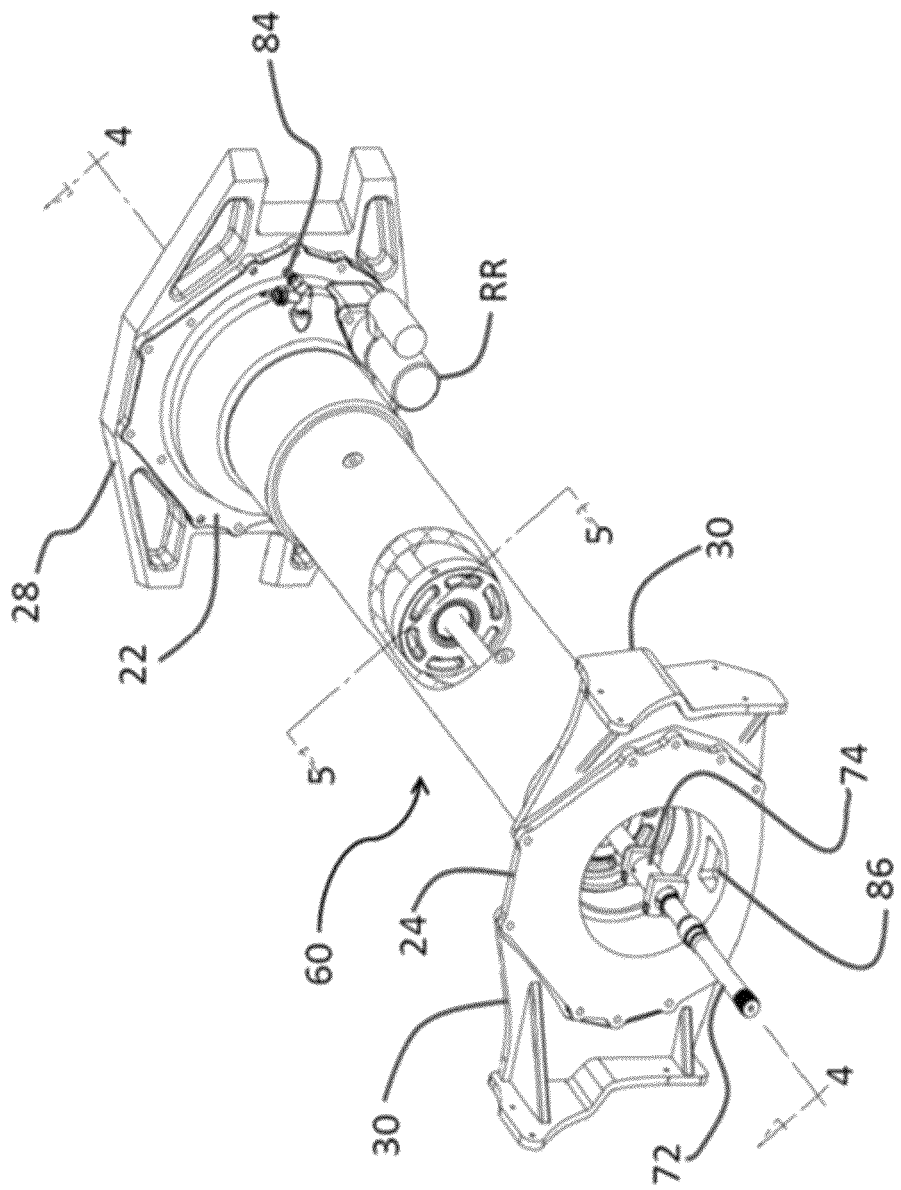
FIG. 3a is a perspective view of the universal chassis of FIG. 1 illustrating a backbone structure coupled to a front and rear structure according to one example.
Figure 3B:
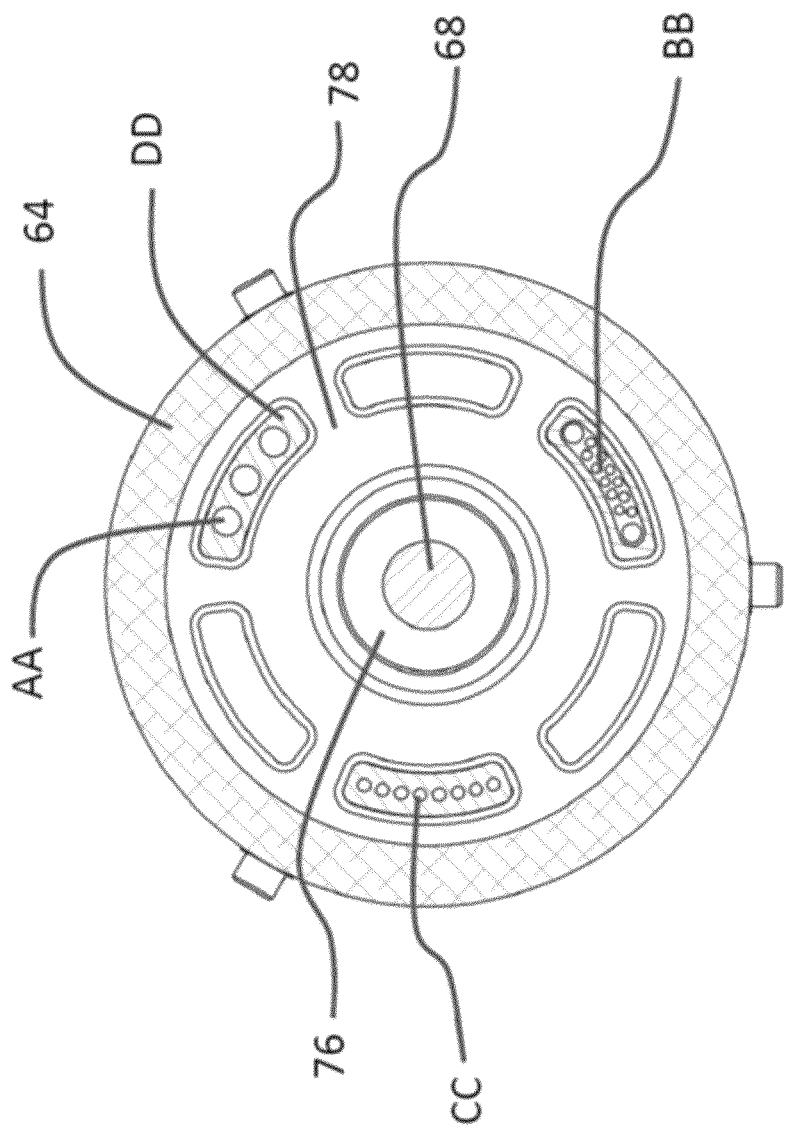
FIG. 3b is a cross-section of the bearing support taken along line 5-5 of FIG. 3a according to one example.
Figure 4:
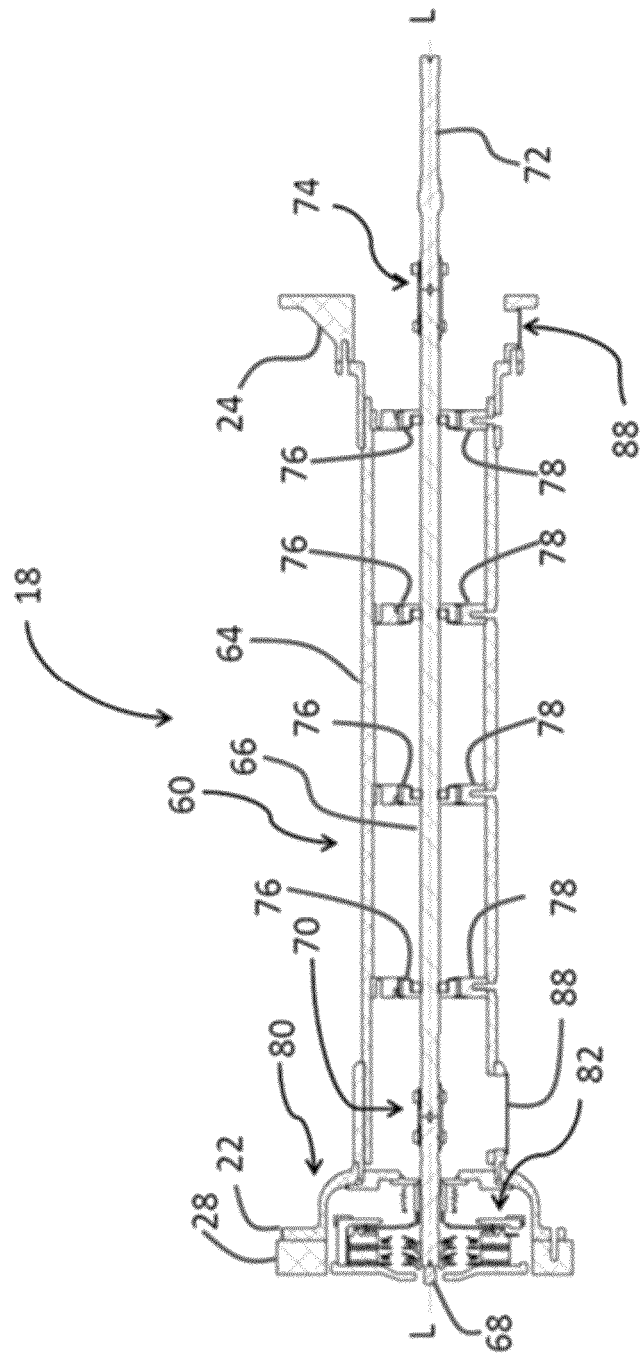
Figure 5:
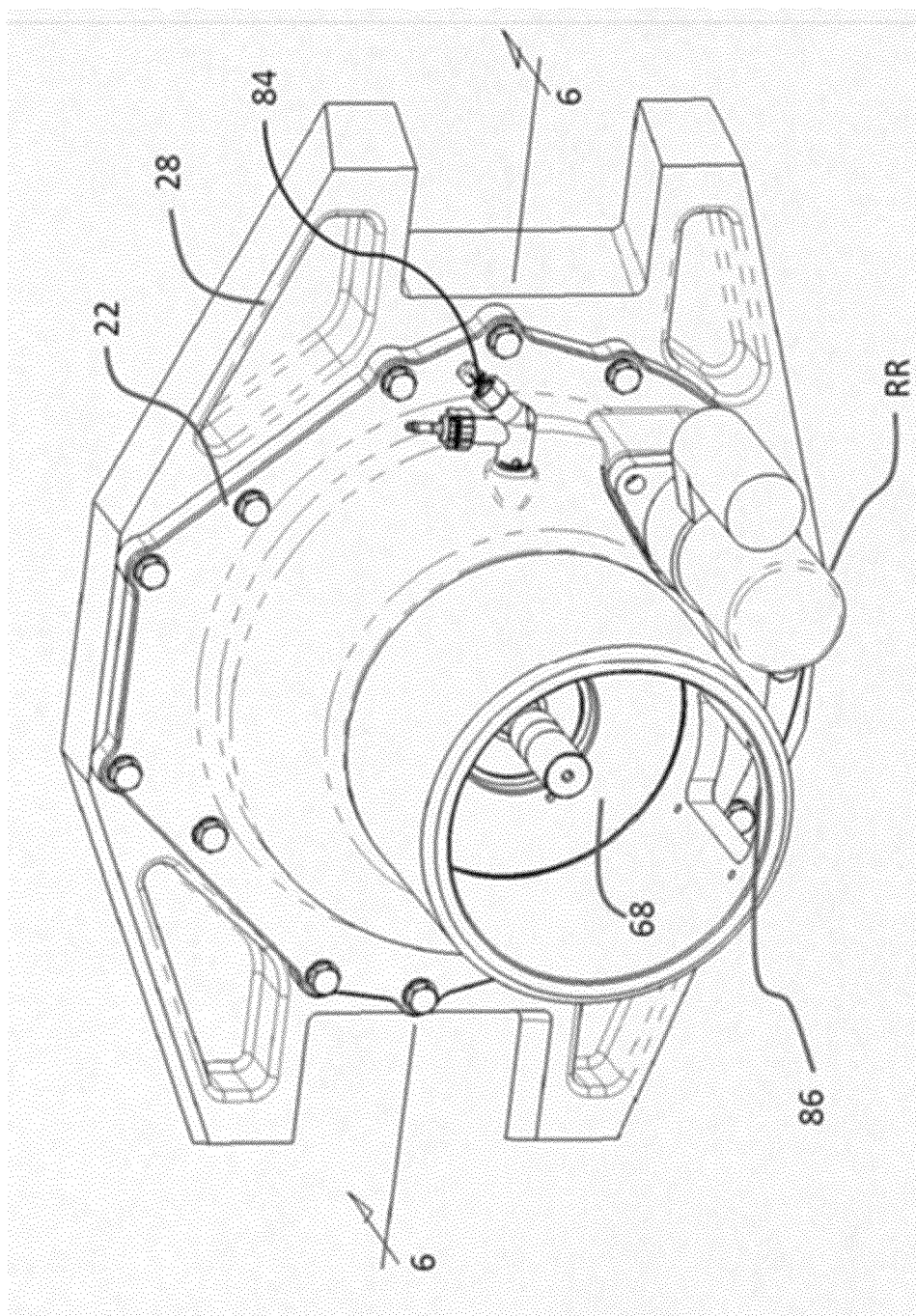
FIG. 5 is a front perspective view of a bell housing associated with the universal chassis of FIG. 3.
Figure 6:
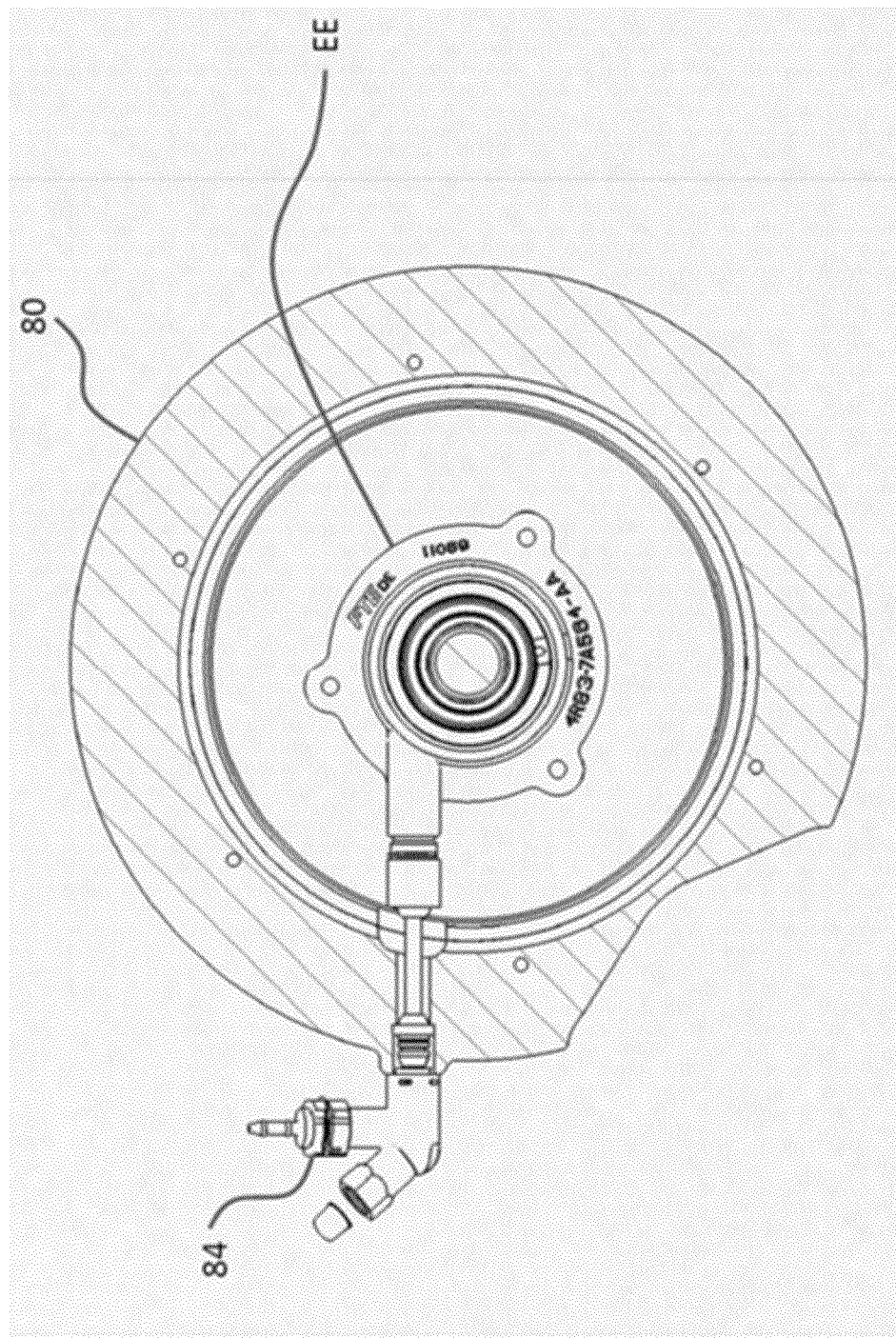
FIG. 6 is a cross-sectional view of the bell housing taken along line 6-6 at FIG. 5.
Figure 7:
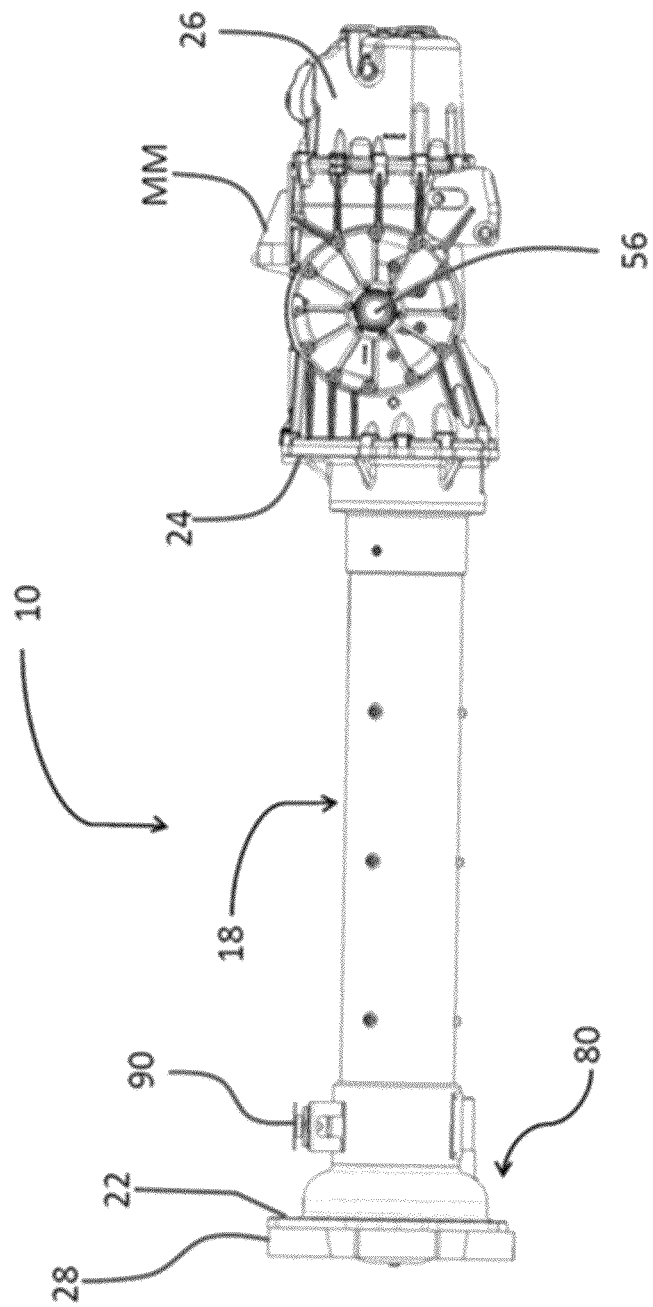
Figure 8A:
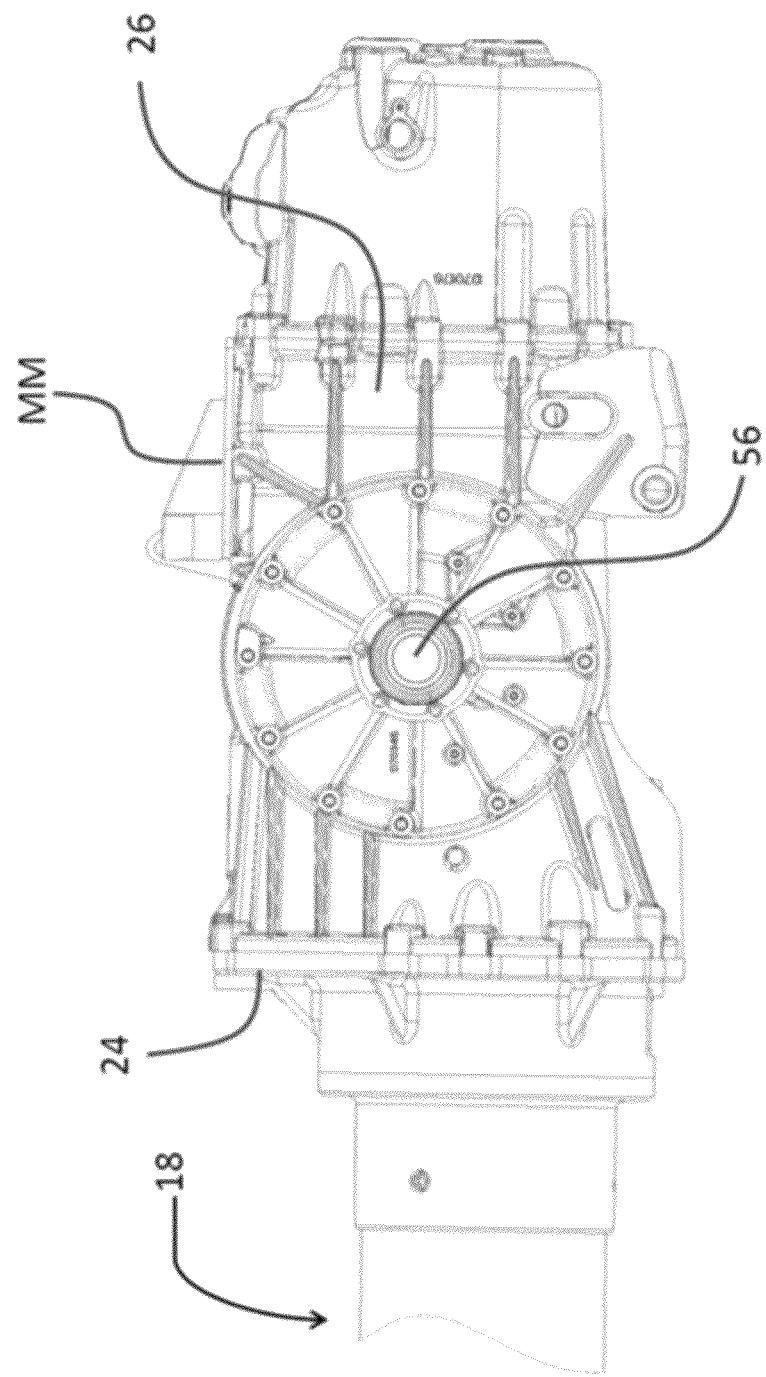
FIG. 8a is a detail side view of the transaxle attachment to the rear structure of FIG. 7.
Figure 8B:
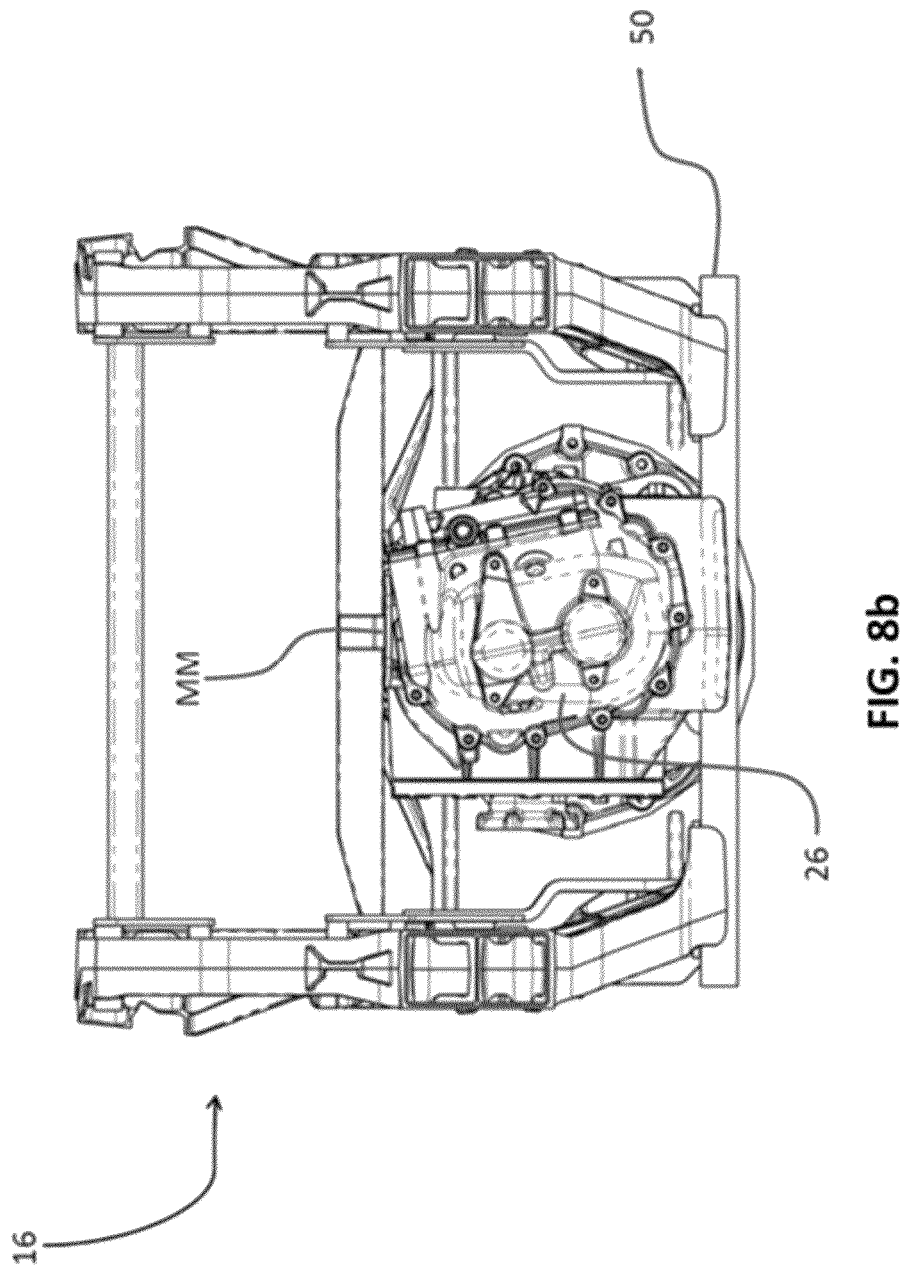
FIG. 8b is a detail rear view of the transaxle and rear structure.
Figure 8C:
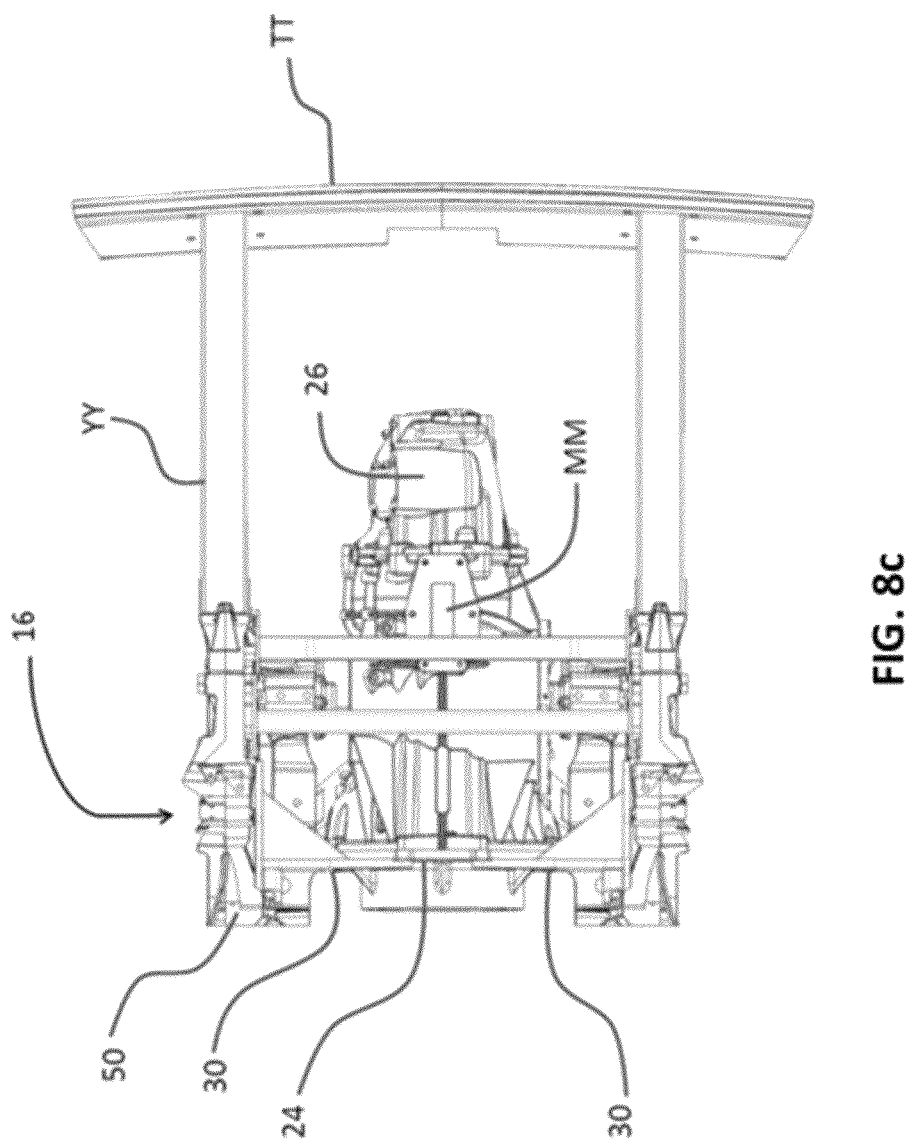
FIG. 8c is a detail top plan view of the transaxle and rear structure.
Figure 9A:
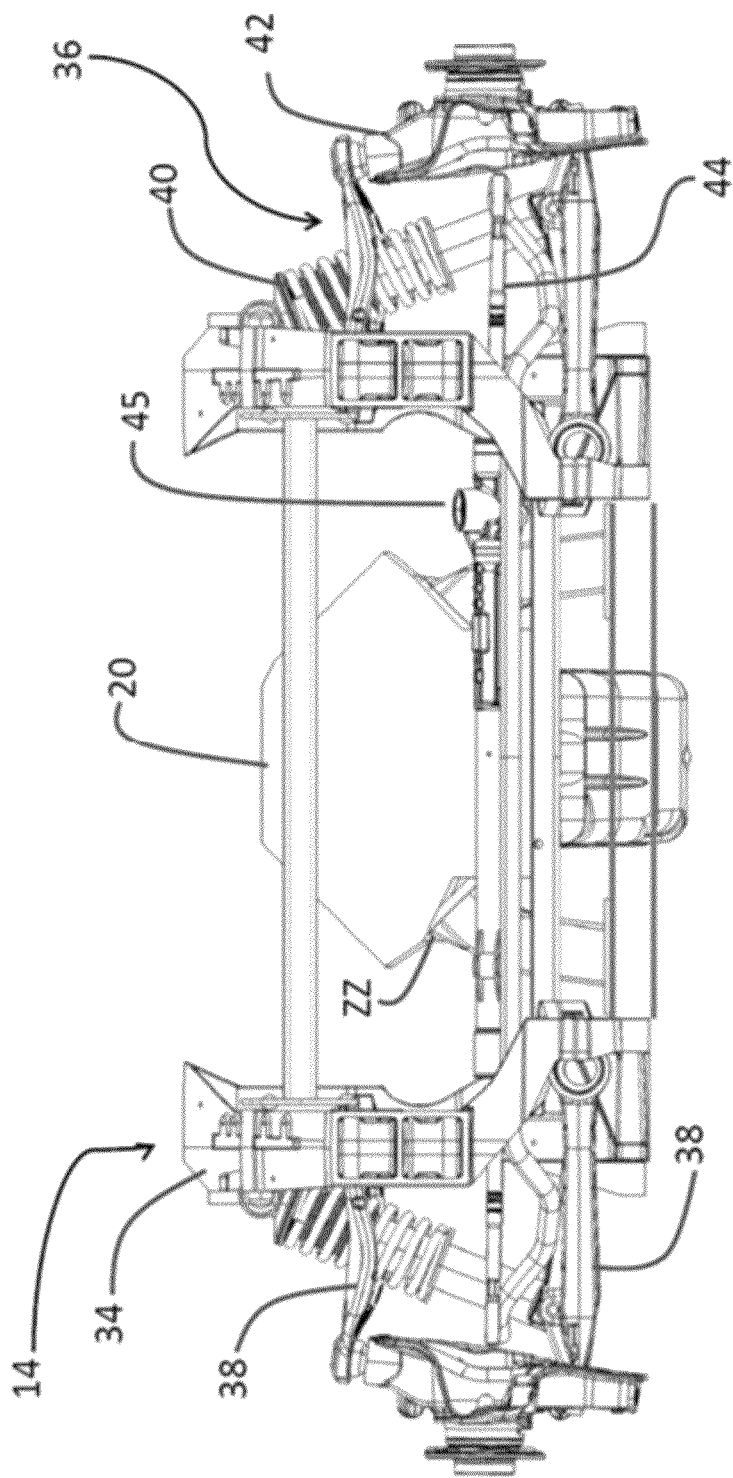
FIG. 9a is a partial front view of the front structure of the universal chassis of FIG. 3a and shown with suspension elements represented as being rigidly attached to the front structure.
Figure 9C:
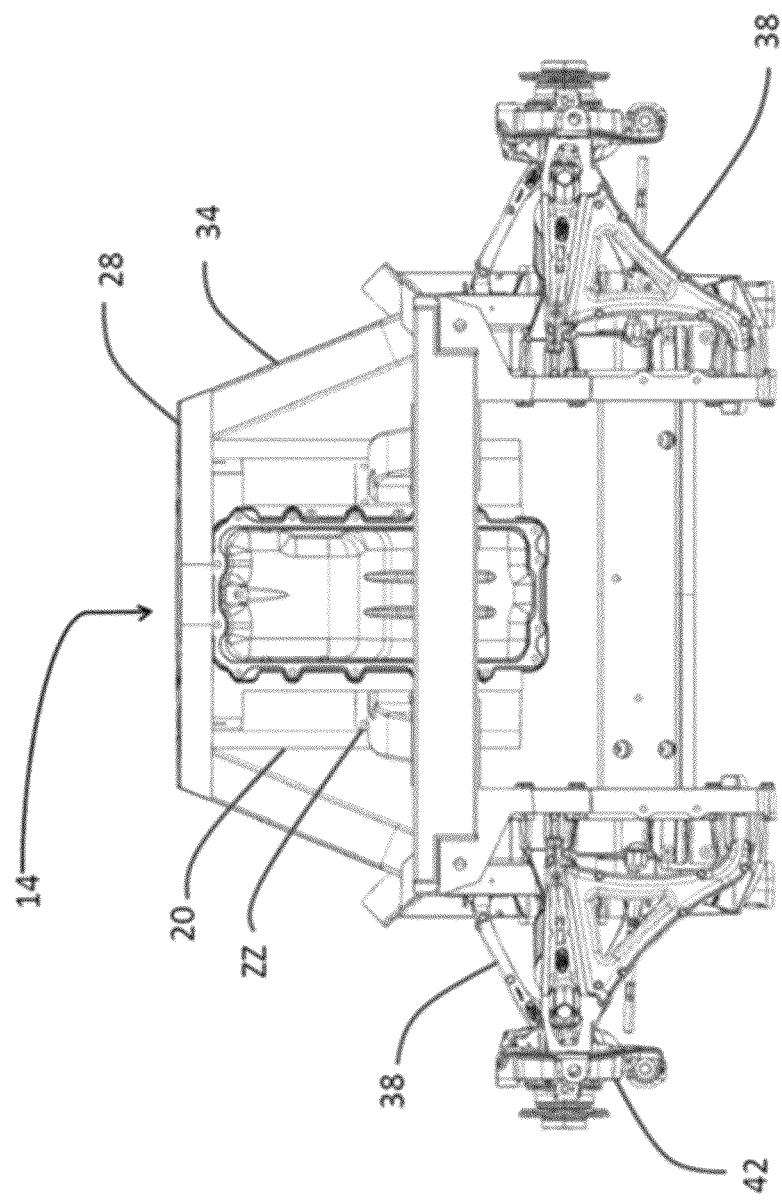
FIG. 9c is a partial bottom plan view of the front structure.

Referring initially to FIGS. 1-2c, a plan view of a unitary or uni-chassis constructed in accordance to the present teachings is shown and generally identified at reference numeral 10. The uni-chassis 10 is shown associated with an exemplary vehicle 12. The uni-chassis 10 includes five major assemblies: a front structure 14 which is coupled to a front energy absorbing crash structure XX, a rear structure 16 which is attached a rear energy absorbing crash structure YY, and a backbone structure 18. The front structure 14 is rigidly attached to an engine 20. Suspension loads are fed directly to the engine 20 through rigid engine mounts ZZ (located substantially near the front of the engine 20, see also FIG. 21), such that the torsional and bending loads are transferred directly through an engine block 20a of the engine 20 to a front mounting flange 22.

The backbone structure 18 is rigidly attached to the front structure 14 through the front mounting flange 22 and rigidly attached to the rear structure 16 through a rear mounting flange 24. The rear structure 16 is rigidly mounted to a transaxle 26. Suspension loads are fed directly into the transaxle 26 through a rigid mount MM (located substantially near the rear of the transaxle 26, see also FIG. 24), such that the torsional and bending loads are transferred through a transaxle case 26a of the transaxle (FIG. 24) to the rear mounting flange 24. As shown in FIG. 2a, a front and rear mounting plate 28 and 30 may be incorporated to couple the front and rear mounting flanges 22 and 24 to the front and rear structures 14 and 16, respectively. As shown in the finite element model FIG. 18, the engine block 20a and transaxle case 26a are of sufficient rigidity such that no other structural members are required to provide adequate chassis stiffness. Explained further, suspension loads are successfully received and accommodated by the engine block 20a at engine mounts ZZ and the transaxle case 26a at mounts MM.

The front structure 14 includes the engine 20 rigidly attached to a front sub-frame 34. In one example, the front structure 14 can be integrally defined with the front mounting plate 28. Attached to the engine 20 and front sub-frame 34 are all the front chassis systems typically mounted to a chassis, including, but not limited to: a suspension system 36 with control arms 38, springs and dampers 40, knuckle and spindle 42; steering system 44 including rack and pinion 45 and tie rods; tire/wheel/brake assemblies 46 attached to the suspension spindle and knuckle; accessory drives including power steering pump, water pump, alternator, etc. (not specifically shown), attached to the engine 20 and front sub-frame 34. Attached to the front structure 14 are the energy management boxes XX having laterally offset frame members that are rigidly fixed (such as by fasteners and/or welding) to the front structure 14 on one end and rigidly fixed to the bumper beam 55 on an opposite end. The energy management boxes XX are configured to (FIG. 2a) deform and absorb front crash loads from a bumper beam SS; transfer them through the front structure 14; to be reacted by the backbone structure 18. The energy management boxes XX are designed to absorb nominally 35 mph front impact loads. The energy boxes XX are bolted to the front structure 14, such that frontal impact loads are transferred through the front structure 14 to the backbone structure 18. The front structure 14 and backbone structure 18 have nominally twice the stiffness of the energy management boxes XX, so that in the majority of crash scenarios the front structure 14 and engine 20 remain undamaged. Optionally, the vehicle cooling system can be attached to the energy management boxes XX, and the bumper beam SS can be either bolted or welded to the energy management boxes XX, depending upon serviceability requirements.

The rear structure 16 of the preferred embodiment, as shown in FIG. 1, consists of the transaxle 26 with a rear sub-frame 50 rigidly attached to it, and optionally, to the rear mounting flange 24 of the backbone structure 18. Attached to the transaxle 26 and rear sub-frame 50 are all the rear chassis systems typically mounted to a chassis, including, but not limited to: a rear suspension system 52 including control arms 54, springs and dampers, knuckle and spindle (not specifically shown); drive shafts 56; and tire/wheel/brake assemblies 58 attached to the knuckle. Coupled to the rear structure 16 are the energy management boxes YY (see also FIG. 22) having laterally offset frame members that are rigidly fixed (such as by fasteners and/or welding) to the rear structure 16 on one end and rigidly fixed to a rear bumper beam TT on an opposite end. The energy management boxes YY are configured to deform and absorb rear crash loads from the rear bumper beam TT; transfer them through the rear structure 16; to be reacted by the backbone structure 18. The energy management boxes YY are designed to absorb nominally 35 mph rear impact loads. The energy boxes YY are bolted to the rear structure 16, such that rear impact loads are transferred through the rear structure 16 to the backbone structure 18. The rear structure 16 and backbone structure 18 have nominally twice the stiffness of the energy management boxes YY, so that in the majority of crash scenarios the rear structure 16 and transaxle 26 remain undamaged. Optionally, the fuel tank (not specifically shown) can be attached to the rear structure 16.

With additional reference now to FIGS. 3a-9, the backbone structure 18 includes a main section 60 having the front mounting flange 22 and the rear mounting flange 24. As described, the front and rear mounting flanges 22 and 24 can be coupled to the front structure 14 and rear structure 16, respectively (FIG. 1) by way of conventional fasteners. Alternatively, the backbone structure 18 can be partially or entirely coupled to the front and/or rear structures 14 and 16 by other methods, such as, but not limited to, welding. In addition, the backbone structure 18 can be integrally formed with the front and/or rear structures 14 and 16.

The main section 60 defines a tube 64 having a quill shaft 66 (FIG. 4) rotatably disposed therewithin. The quill shaft 66 can be co-axial to a longitudinal centerline L of the tube 64. The quill shaft 66 is attached at a front end to an engine output shaft 68 through a first coupler 70. The quill shaft 66 is attached at a rear end to a transaxle input shaft 72 through a second coupler 74. The quill shaft 66 is supported by isolated bearings 76 mounted inside and attached to the backbone structure 18, in order to control run-out of the quill shaft 66. The isolated bearings 76 are supported by bearing supports 78. As depicted in the cross-section (FIG. 3b), the bearing supports 78 incorporate dedicated slots that provide a secure passage for routing of fuel lines AA, electrical lines BB and brake lines CC from the front to the rear of the vehicle. These lines are isolated from the bearing support by grommets DD. This unique positioning of these lines in the slots protects them from external environmental elements (salt, water, corrosion, etc.) and prevents damage in the event of a vehicle crash. In one example, the front mounting flange 22 may be integrally formed with a bell housing 80. The bell housing 80 can house a flywheel/clutch assembly 82, starter motor RR, and also define a bleeder assembly 84 for a hydraulic clutch actuator EE.

The primary function of the backbone structure 18 is to rigidly connect the front and rear structures 14 and 16 to form the uni-chassis 10. The backbone structure 18 is a one-piece closed section tubular structure, and as shown in the preferred embodiment, has the tube 64 that defines a circular cross-section. The tube 64 may be changed in size and form to optimize backbone properties. The size, shape and material of the backbone structure 18 must be selected so that acting in unison with the front and rear structures 14 and 16, the uni-chassis 10 provides sufficient torsional and bending rigidity and strength. Because the uni-chassis 10 does not incorporate a conventional frame, the backbone structure 18 forms the connection between the front and rear structures 14 and 16. The chassis loads are therefore transmitted solely by the backbone structure 18 between the front and rear structures 14 and 16.

In a typical automotive application, the backbone structure 18 should provide approximately 10,000 ft-lb/deg. (minimally 4000) torsional stiffness and 25,000 lb/in (minimally 10,000) bending stiffness; and must have sufficient strength, such that it can withstand at least 2 g vehicle loads in bending and torsion (transmitted through the suspensions 38 and 52 of the front and rear structures 14 and 16, respectively), without permanent yield. In one example, the tube 64 can define an outer diameter of between 6 and 10 inches, and preferably 8 inches. The tube 64 can be formed of a rigid lightweight material such as, but not limited to, aluminum. The tube 64 can have a wall thickness of substantially about 0.5 inch. As shown in FIG. 18, finite element modeling confirmed that an 8 inch diameter, 0.5 inch wall aluminum backbone will provide 13,000 ft-lbs/degree torsion and 47,000 lbs./inch bending stiffness—far exceeding the above mentioned requirements.

The secondary function of the backbone structure 18 as shown in the preferred embodiment is to act as a torque tube to provide support for the transfer of torque from the engine 20 in the front structure 14 to the transaxle 26 in rear structure 16 through the quill shaft 66.

The backbone structure 18 may be flared out at the front (e.g. the bell housing 80) through the front mounting flange 22 to get around the flywheel/clutch assembly 82 to attach to the engine 20. This bell housing 80 may be a separate part, but maintains backbone stiffness by being rigidly attached to the backbone structure 18. Similarly, the rear of the backbone structure 18 can be flared to attach to the rear structure 16 through the rear mounting flange 24. The backbone structure 18 may also incorporate additional holes, such as holes 86 (FIGS. 3, 5 and 19) and cover plates, such as cover plates 88 (FIG. 4) to provide access to the quill shaft 66 and/or the first and second couplers 70 and 74.

With reference to FIGS. 10 and 11, various exemplary body mounts 90 are shown. A vehicle body 92 includes a lateral beam or cross-member 94 coupled to the backbone structure 18. As can be appreciated, the vehicle body 92 can comprise various body components, such as seats 96. The cross-member 94 can be suitably attached to the backbone structure 18 at or near a torsional node defined in the tube 64. The uni-chassis 10 of the present invention allows various loads associated with the vehicle body 92 to be substantially de-coupled from various loads associated with the uni-chassis 10. A body tunnel 98 can be defined by the body 92. The body tunnel 98 can accommodate the tube 64, and is designed to interfere with the backbone tube, so that side impact crash forces on the body can be reacted by the backbone.

While the preferred embodiment depicts a uni-chassis 10 utilizing the engine 20 as part of the front structure 14 and transaxle 26 as part of the rear structure 16, connected by a backbone structure 18, the uni-chassis concept can be applied to other powertrain arrangements. For example, a typical rear wheel drive (RWD) vehicle (such as the one shown in FIG. 1) with front engine 20 and transmission and rear axle and drive shaft 56 can utilize the engine 20 and transmission as the core of the front structure 14 for attaching the front chassis systems, and the rear axle as the core of the rear structure 16 for attaching the rear chassis systems, connected by a backbone structure 18 incorporating a quill shaft 66 similar to that depicted in the preferred embodiment.

The application of the uni-chassis concept to this, and other powertrain arrangements, including front wheel (FWD) and four wheel (4 WD) drive; are tabulated below:

TABLE 1

Alternative uni-chassis Powertrain Arrangements

| | | Front Structure | Backbone | Rear Structure |
|---|---|---|---|---|
| A. | RWD | Engine | Engine to Transaxle | Transaxle |
| | | Engine & Transmission | Transmission to Axle | Axle |
| | | Front Chassis Structure | Front Structure to Engine | Engine & Transaxle |
| | | Front Chassis Structure | Front Structure to Transaxle | Transaxle & Engine |
| B. | FWD | Engine & Transaxle | Transaxle to Rear Structure | Rear Chassis Structure |
| | | Transaxle & Engine | Engine to Rear Structure | Rear Chassis Structure |
| C. | 4WD | Engine, Front Axle | Engine to Transaxle | Transaxle |
| | | Engine, Transmission, Front Axle | Transmission to Axle | Rear Axle |
| | | Front Axle | Front Axle to Engine | Engine & Transaxle |
| | | Front Axle | Front Axle to Transaxle | Transaxle & Engine |

The uni-chassis concept is not limited in application to conventional powertrain technology. For example, an electric powertrain application (FIG. 15) might use a front and/or rear motor for the front and rear structures, and the backbone structure to house the batteries, to create a two or four wheel drive (4WD) electric vehicle. A hybrid powertrain (FIG. 16) might use a front internal combustion engine and motor generator on a first end and an electric motor on an opposite end. Again, a backbone structure can house the batteries and connect front and rear structures. A dual mode hybrid powertrain (FIG. 17) might incorporate a differential at one end and a dual mode electronic transmission incorporated in the backbone structure. Many other arrangements of new powertrain technologies can be applied to the uni-chassis concept, by using one or more of the powertrain elements e.g., engine, transmission or axle, to create the core of the front or rear structures and connect them with a backbone.

An exemplary method of constructing a vehicle according to the present teachings will now be described. The present invention provides flexibility in creating a unique chassis for any given conventional vehicle (internal combustion engine, transaxle, suspension etc.) electric vehicle or hybrid vehicle while still maintaining the same uni-chassis architecture. In this way, a vehicle manufacturer (or assembler) can select a desired vehicle configuration and powertrain. A front and rear structure with front and rear energy management structure can then be assembled to accommodate the selected vehicle configuration and vehicle powertrain. A central backbone structure can be assembled between the front and rear structures to create a rolling chassis. During attachment of the central backbone between the front and rear structures, the operational components (e.g., quill shaft for conventional vehicle, battery for electric or hybrid vehicle), are suitably coupled or connected. The closed tube of the central backbone can be made to any desired length suitable for the desired application. The desired vehicle body can then be coupled to the rolling chassis.

With particular reference now to FIGS. 19-21, additional features of the front structure 14 will be described in greater detail. The front structure 14 can generally include the front sub-frame 34. The front sub-frame 34 can include an upper cross member 110, a middle cross member 112, and a lower cross member 114 all rigidly connected between front lateral frame members 120. The upper cross member 110, the middle cross member 112, and the lower cross member 114 can all be rigidly affixed to the front lateral frame members 120 such as by way of rigid fasteners and/or welding. It will be appreciated that the front lateral frame members 120 may consist of a collection of rigidly connected frame components. Engine brackets 122 (FIG. 21) are rigidly affixed between the lower cross member 114 and the engine block 20*a*. Specifically, first ends of the engine brackets 122 can be welded to the lower cross member 114 while second ends of the engine brackets 122 are rigidly connected to the engine block 20*a* at the engine mounts ZZ. In the particular example shown in FIG. 21, the engine mount ZZ includes a flange that is bolted by way of bolts 130 into the engine block 20*a*. In addition, bolts 132 (FIG. 19) rigidly connect the front mounting flange 22, the front mounting plate 28 and the engine block 20*a* of the engine 20 (see FIG. 20). Bolts 132 can be arranged around the front mounting flange 22 for directly threadably mating into the engine block 20*a*. The bolts 132 can extend through complementary bores defined in the front mounting flange 22 and the front mounting plate 28. A pair of dowels 134 can additionally be located through the front mounting flange 22, the front mounting plate 28, and the engine block 20*a* of the engine 20. The front sub-frame 34 can further comprise a pair of angled frame members 34*a* that are generally rigidly affixed between the front lateral frame members 120 and the front mounting plate 28.

The front mounting plate 28 comprises two pairs of outwardly extending arms 28*a* and 28*b* that nestingly and fixedly receive the angled frame members 34*a*. The angled frame member 34*a* can be welded to the arms 28*a* and 28*b*. The configuration facilitates accommodation of torsioned forces in the front structure 14.

With reference now to FIGS. 22-24, additional features of the rear structure 16 will be further described. The rear sub-frame 50 of the rear structure 16 can generally include an upper cross member 140, a middle cross member 142, and a lower cross member 144 all rigidly connected between a pair of rear lateral frame members 148. The upper cross member 140, the middle cross member 142, and the lower cross member 144 are all rigidly attached to the respective rear lateral frame members 148 by way of fasteners such as bolts and/or welding. The rear lateral frame members 148 can comprise a collection of rigidly attached frame components. The rear mounting plate 30 can collectively comprise a first rear mounting plate 30a and a second rear mounting plate 30b. The first and second rear mounting plates 30a and 30b are rigidly connected between the rear lateral frame members 148 and the rear mounting flange 24 by way of bolts 154. As illustrated in FIG. 23, the bolt 154 can extend through the rear mounting plate 30b, the rear mounting flange 24, and a transaxle mounting flange 26a of the transaxle 26. It will be appreciated that the mounting arrangement of the first rear mounting plate 30a may be rigidly attached in a similar manner. A transaxle mounting bracket 160 rigidly connects the rigid mount MM with the middle cross member 142. In the example provided, the transaxle mounting bracket 160 is rigidly affixed to the transaxle 26 by way of bolts 162 extending through the rigid mount MM and into the transaxle 26.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A chassis for use in an automotive vehicle, comprising:
   a central backbone structure including a closed section tubular structure;
   an engine;
   a first structure comprising a first sub-frame that supports the engine and is coupled to one end of the backbone structure;
   a first energy absorbing crash structure including a first pair of laterally extending frame members that are rigidly fixed to the first structure on a first end and rigidly fixed to a first bumper beam on a second end;
   a second structure coupled to the opposite end of the backbone structure and including a transaxle;
   a second energy absorbing crash structure including a second pair of laterally extending frame members that are rigidly fixed to the second structure on a first end and rigidly fixed to a second bumper beam on a second end;
   wherein the engine and the transaxle are stressed by ride and handling loads and wherein the central backbone structure is rigidly attached to the engine and to the transaxle such that the ride, handling and impact crash loads are transmitted between the first and second structures solely by the central backbone structure.

2. The chassis of claim 1 wherein the closed section tubular structure comprises bearing supports that define dedicated slots for receiving fuel, electrical and brake lines respectively therethrough.

3. The chassis of claim 1 wherein the central backbone structure further comprises:
   a shaft rotatably housed within the closed section tubular structure of the central backbone and configured to transmit a rotatable output from the engine to a rotatable input of the transaxle.

4. The chassis of claim 3 further comprising bearings supported by the bearing supports, wherein the shaft is rotatably supported by the bearings arranged within the closed section tubular structure.

5. The chassis of claim 3 wherein the backbone structure includes a first mounting flange coupled to a first mounting plate associated with the first structure and a second mounting flange associated with the second structure.

6. The chassis of claim 5, further comprising a bell housing integrally formed with the first mounting flange, the bell housing having at least one of a flywheel and a clutch pack assembly contained therewithin and provisions for a starter motor and a hydraulic clutch actuator.

7. The chassis of claim 3 wherein the closed section tubular structure defines a torque tube that transmits an engine torque between the first and second structures.

8. The chassis of claim 7 wherein the closed section tubular structure is formed of aluminum having a diameter of substantially 8 inches and a wall thickness of substantially 0.5 inches.

9. The chassis of claim 1 wherein the second structure is rigidly fixed to the transaxle.

10. The chassis of claim 1 wherein the engine and the first structure are provided on a front end of the automotive vehicle.

11. An automotive vehicle chassis, comprising:
    a central backbone structure defining a closed outer tube having a first mounting flange adjacent one end and a second mounting flange adjacent an opposite end;
    an engine;
    a shaft rotatably supported within the closed outer tube and driven by the engine;
    a first structure comprising a first sub-frame that is rigidly coupled to the engine and is rigidly coupled to the first mounting flange of the backbone structure;
    a first energy absorbing crash structure that is rigidly fixed to the first structure;
    a transaxle driven by the shaft;
    a second structure comprising a second sub-frame that is rigidly coupled to the transaxle and coupled to the second mounting flange on the opposite end of the backbone structure;
    a second energy absorbing crash structure that is rigidly fixed to the second structure;
    a vehicle body coupled to the backbone structure at a torsional node defined in the outer tube;
    a front suspension system attached to the engine through the first sub-frame; and
    a rear suspension system attached to the transaxle through the second sub-frame, the front and rear suspension systems directing chassis loads onto the engine and transaxle, respectively;
    wherein the chassis loads are transferred between the first and second structures entirely by the backbone structure and are substantially de-coupled from body loads and wherein the engine and transaxle are stressed by the chassis loads.

12. The chassis of claim 11 wherein the first mounting flange is bolted to an engine block of the engine.

13. The chassis of claim 12, further comprising a front mounting plate that is interposed between the engine block and the first mounting flange, wherein at least one bolt extends through complementary bores in the first mounting flange and front mounting plate and threadably mates with the engine block.

14. The chassis of claim 13 wherein the front mounting plate comprises two pairs of outwardly extending arms, wherein each pair of the outwardly extending arms nestingly receive frame members of the first sub-frame.

15. The chassis of claim 12, wherein the first sub-frame comprises a pair of engine brackets that rigidly connect between a cross member of the first sub-frame and the engine block.

16. The chassis of claim 15 wherein each engine bracket of the pair of engine brackets comprises a flange that receives at least one bolt that threadably mates into the engine block.

17. The chassis of claim 11 wherein the second mounting flange is bolted to the transaxle.

18. The chassis of claim 17, further comprising at least a first rear mounting plate that is rigidly fixed to a rear lateral frame member of the second sub-frame, wherein at least one bolt extends through the first rear mounting plate, the second mounting flange and threadably mates into a mounting flange of the transaxle.

19. The chassis of claim 18, further comprising a transaxle mounting bracket that rigidly connects between a crossmember of the second sub-frame and the transaxle.

20. The chassis of claim 19 wherein the transaxle mounting bracket comprises a flange that receives at least one bolt that threadably mates into the transaxle.

21. The chassis of claim 16 wherein the closed outer tube comprises a cylindrical tube having bearing supports that define dedicated slots that receive fuel, electrical and brake lines, respectively.

22. The chassis of claim 17 wherein the shaft is rotatably supported by bearings supported by the bearing supports arranged within the closed outer cylindrical tube.

23. The chassis of claim 11, further defining a bell housing integrally formed with the first mounting flange, the bell housing having at least one of a flywheel and a clutch pack assembly contained therewithin.

24. The chassis of claim 11 wherein the closed outer cylindrical tube is formed of aluminum having a wall thickness of about 0.5 inches.

25. An automotive vehicle chassis, comprising:
a central backbone structure defining a closed outer cylindrical tube having a first mounting flange adjacent one end and a second mounting flange adjacent an opposite end;
an engine having an engine block;
a shaft rotatably supported within the closed outer cylindrical tube and driven by the engine;
a first structure comprising a first sub-frame that is rigidly coupled to the engine and is rigidly coupled to the first mounting flange of the backbone structure, the first sub-frame including a pair of first lateral frame members, a pair of angled frame members rigidly coupled to the respective first lateral frame members and, a first cross-member fixedly coupled between the pair of first lateral frame members;
a first mounting plate interposed between the engine block and the first mounting flange, the first mounting plate having two pairs of arms extending outwardly therefrom, wherein each pair of arms nestingly receives an angled frame member of the pair of angled frame members;
at least one first bolt that extends through complementary bores in the first mounting flange and the first mounting plate and threadably mates with the engine block thereby fixedly coupling the closed outer cylindrical tube, the first mounting flange, the first mounting plate and the engine block;
a first energy absorbing crash structure that is rigidly fixed to the first structure;
a transaxle driven by the shaft;
a second structure comprising a second sub-frame that is rigidly coupled to the transaxle on one end and coupled to the second mounting flange on an opposite end of the backbone structure, the second structure including a pair of second lateral frame members and a second cross member coupled between the pair of second lateral frame members;
a second mounting plate rigidly coupled to one of the second lateral frame members;
at least one second bolt that extends through the second mounting plate and the second mounting flange and threadably mates with the transaxle thereby fixedly coupling the closed outer cylindrical tube, the second mounting flange, the second mounting plate and the transaxle;
a second energy absorbing crash structure that is rigidly fixed to the second structure;
a front suspension system attached to the engine through the first sub-frame; and
a rear suspension system attached to the transaxle through the second sub-frame, the front and rear suspension systems directing chassis loads onto the engine and transaxle, respectively;
wherein the chassis loads are transferred between the first and second structures entirely by the backbone structure and wherein the engine and transaxle are stressed by the chassis loads.

26. A method of manufacturing a vehicle, the method comprising:
selecting a vehicle configuration from a group essentially comprising: a rear wheel drive configuration, a front wheel drive configuration, and a four wheel drive configuration;
selecting a vehicle powertrain from a group essentially comprising: an internal combustion engine, an electric motor, and a combination thereof;
assembling a front structure to accommodate the selected vehicle configuration and vehicle powertrain;
assembling a front energy absorbing crash structure to the front structure;
assembling a rear structure to accommodate the selected vehicle configuration and vehicle powertrain, one of the front or rear structures comprising a first suspension system that is mounted to the vehicle powertrain and that stresses the vehicle powertrain;
assembling a rear energy absorbing crash structure to the rear structure;
coupling a central backbone structure between the front and rear structures to create a rolling chassis, the central backbone structure comprising a closed tubular structure that is operable to accommodate ride, handling and crash loads between the front and rear structures; and
attaching a vehicle body to the rolling chassis.

27. The method of claim 26, further comprising:
determining an optimal length of the central backbone structure based on the selected vehicle configuration and vehicle powertrain; and
assembling the central backbone structure based on the determined optimal length.

28. The method of claim 27 wherein assembling the central backbone structure comprises:
rotatably disposing a quill shaft through a closed tube;
coupling a first end of the quill shaft to an engine output shaft; and
coupling a second end of the quill shaft to an input shaft of a transaxle.

* * * * *